United States Patent [19]
Tanaka et al.

[11] Patent Number: 5,144,426
[45] Date of Patent: Sep. 1, 1992

[54] MOTION COMPENSATED PREDICTION INTERFRAME CODING SYSTEM

[75] Inventors: Akiyoshi Tanaka, Kawasaki; Satoshi Matsuya, deceased, late of Sagamihara, by Yasue Matsuya, legal heir; Wataru Fujikawa, Yokohama; Hiroyuki Uwabo, Tokyo; Ikuo Inoue, Yokohama; Atsushi Nagata, Hirakata, all of Japan

[73] Assignee: Matsushita Electric Industrial Co., Ltd., Osaka, Japan

[21] Appl. No.: 597,853

[22] Filed: Oct. 12, 1990

[30] Foreign Application Priority Data

Oct. 13, 1989 [JP] Japan .................................. 1-266478
Oct. 13, 1989 [JP] Japan .................................. 1-266479
Jan. 19, 1990 [JP] Japan .................................. 2-11284
Jun. 19, 1990 [JP] Japan .................................. 2-160520

[51] Int. Cl.$^5$ ...................... H04N 7/133; H04N 7/137
[52] U.S. Cl. .................................... 358/133; 358/136; 358/138; 358/105
[58] Field of Search ............... 358/133, 135, 136, 138, 358/105

[56] References Cited
U.S. PATENT DOCUMENTS 4,517,596 5/1985 Suzuki ................................. 358/133
4,821,119 4/1989 Gharaui .............................. 358/136

OTHER PUBLICATIONS

Multidimensional Signal Processing of TV Picture, Nikkan Kogyo Shinbun Company, Chapter 7 "Efficient Coding", pp. 213-291 (Nov. 15, 1988).
CCITT(Comite Consultatif Internationale Telegraphique et Telephonique) SGXV Document #525: Description of Ref. Model 8 (RM 8), Working Party XV/4 Specialist Group on Coding for Visual Telephony (Jun. 9, 1989).

Primary Examiner—Howard W. Britton
Attorney, Agent, or Firm—Lowe, Price, LeBlanc & Becker

[57] ABSTRACT

A motion compensated prediction interframe coding system which first measures characteristics regarding the fineness of a pattern or texture of a picture, which is represented by an input television signal and is divided into a group of continuous blocks each quantized by using a quantization step size, and changes the quantization step size into a smaller one if quantizes a block having a picture pattern or texture finer than patterns of the other blocks. Thereby, an amount of generated codes can be limited but a motion compensated prediction frame coding operation can be performed without degrading the fineness of the texture of the original input picture.

17 Claims, 7 Drawing Sheets

MOTION COMPENSATED PREDICTION INTERFRAME CODING SYSTEM

BACKGROUND OF THE INVENTION

1. Field of the Invention

This invention generally relates to a television system and more particularly to a motion compensated prediction interframe system for performing motion compensated prediction interframe coding of television signals.

2. Description of the Related Art

Recently, with advance in techniques of moving picture coding, a motion compensated prediction interframe coding system has been developed as an efficient coding system for effecting an efficient coding of a color moving picture for use in a visual telephone (or video telephone), a video conference system, CD ROM, a digital video tape recorder (VTR) and so on. An example of a motion compensated prediction interframe coding system is described in T. Fukinuki: Multidimensional Signal Processing of TV Picture, Nikkan Kogyo Shinbun Company, Chapter 7 "Efficient Coding", pp. 213-291 (1988. 11. 15).

When a large quantity of prediction error signals is generated, the motion compensated prediction interframe coding system limits an amount of codes of the generated prediction error signals by employing a large step size for quantization (hereunder sometimes referred to as a quantization step size) in such a way that at the coding of a picture can be achieved a constant frame rate. An example of a conventional method of determining a step size for quantization is disclosed in CCITT (Comite Consultatif Internationale Telegraphique et Telephinque) SGXV Document #525: Description of Ref. Model 8 (RM 8), Working Party XV/4 Specialist Group on Coding for Visual Telephony (1989. 6. 9).

Hereinafter, a prior art motion compensated prediction interframe coding system will be describe by referring to FIG. 1.

In this figure, reference numeral 51 represents an input terminal from which television signals are inputted to the system; 53 a motion vector calculating portion for comparing a picture signal of a block (hereunder referred to as a coding block), which is to be coded, of a current frame with a reproduced picture signal of a previous frame and calculating a motion vector; 54 a picture memory portion for storing reproduced picture signals of a current and previous frames; 58 a motion compensation predicting portion for performing a motion compensation predicting of the reproduced picture signals of the pervious frame; 60 a coding method selection portion for selecting a method of coding of a block from an interframe coding and intraframe coding methods; 62 an intra-loop filter portion for performing two-dimensional lowpass filtering processing of a motion compensation predicting signal; 64 a prediction error evaluating portion for evaluating a prediction error by computing the difference between an original picture signal and a predictive signal of a coding block; 66 a switch portion for selecting a signal, of which an orthogonal transform is effected, in accordance with a coding method selecting signal and further selecting a signal from which a reproduced picture is calculated; 68 an orthogonal transform portion for performing an orthogonal transform of the selected signal; 70 a quantization portion for quantizing coefficients of an orthogonal transform (hereunder referred to as orthogonal transform coefficients) of the selected signal; 73 a quantization step-size computing portion for computing a step size for the quantization; 74 a code memory portion for temporarily storing a transmission frame; 76 an inverse orthogonal transform portion for effecting an inverse orthogonal transform of the quantized coefficients of the orthogonal transform; 78 a reproduced picture calculating portion for calculating a reproduced picture of a current frame; 82 a prediction error coding portion for performing what is called "transmitting channel coding" of a prediction error; 84 a motion vector coding portion for performing the transmitting channel coding of a motion vector; 86 a multiplexer portion for computing a transmitting frame on the basis of the prediction code and the motion vector; and 89 an output terminal from which a transmission signal is output.

Hereinafter, an operation of the prior art motion compensated prediction interframe coding system having the above described arrangement will be described.

First, television signals are converted into digital television signals by an analog-to-digital (A/D) conversion circuit (not shown). Then, pixels represented by the digital television signals are divided into blocks each of which is a rectangular array composed of $M \times N$ pixels arranged in M columns and N rows. Further, the digital television signals are input to the system from the input terminal 51 as input television signals 52. Then, the motion vector calculating portion 53 compares the input television signal with a reproduced picture signal 55 of a previous frame stored in the picture memory portion 54 and calculating the motion of a coding block as a motion vector and moreover outputs a motion vector signal 56 representing the motion vector. Simultaneously, the motion vector calculating portion 53 judges from the result of the evaluation of the motion vector whether the motion compensation made with respect to the coding block is effective or ineffective. Further, the motion vector calculating portion 53 outputs a motion compensation control signal which represents the result of the judgement and is superposed on the motion vector signal 56.

The motion compensation prediction portion 58 performs a motion compensation prediction of the reproduced television signal 55 of a previous frame in case where the motion compensation control signal indicates that the motion compensation prediction is effective and outputs the reproduced television signal without change as a motion compensation prediction signal 59 in case where the motion compensation control signal indicates that the motion compensation prediction is ineffective.

The coding method selection portion 60 compares the input television signal 52 with the motion compensation prediction signal 59 every block and judges whether or not the motion compensation prediction is effective. Further, the coding method selection portion 60 judges that an intraframe coding method is effective for a current block in question in case where the motion compensation prediction is effective and that an interframe coding method is effective for a current block in question in case where the motion compensation prediction is not effective, and outputs a coding method selection signal 61 representing the result of this judgement. In this way, a coding method to be used in coding each block may be changed from the intraframe coding method to the interframe coding method and vice versa. This can make the following improvements on another conventional system which employs only the interframe coding method:

(1) Picture quality can be improved after a scene is changed because the intraframe coding method is employed when the scene is changed.

(2) Picture quality can be also improved when a moving body largely moves because a background which has hid itself behind the moving body emerges from behind it and in such a case, the intraframe coding is employed.

Incidentally, in case of a coding method employed in storage type media such as CD ROM, it is necessary to insert a frame of which all blocks are coded by performing the intraframe coding method (hereunder referred to as a refreshment frame) between frames every constant frame period in order to realize an editing function and a backward editing function of a reproduced picture. Further, the insertion of the refreshment frame can be achieved by providing the motion compensation prediction interframe coding system with the intraframe coding function.

Then, the intra-loop filtering portion 62 performs the two-dimensional lowpass filtering processing of a coding block of which the motion compensation prediction is effected by using the motion vector and further outputs a prediction signal 63. Subsequently, the prediction error evaluating portion 64 evaluates the difference between the input television signal 52 and the prediction signal 63 of the coding block and outputs a prediction error signal 53 representing the evaluated difference.

Thereafter, in case where the coding method selection signal 61 indicates that the intraframe coding method is selected, the switching portion 66 selects the input television 52 as a signal 67 to be transformed by performing the orthogonal transform. In contrast, in case where the coding method selection signal 61 indicates that the interframe coding method is selected, the switching portion 66 selects the prediction error 65 as a signal 67.

Further, the orthogonal transform portion 68 performs the orthogonal transform of the signal 67 to remove therefrom effects of the high-degree correlation between each pair of the neighbors of a pixel corresponding to the signal 67 and further outputs orthogonal transform coefficients 69. At that time, a discrete cosine transform (DCT), which has a high efficiency of transform and of which firmware may be realized, is usually employed as the orthogonal transform.

Then, the quantization portion 70 quantizes the prediction error orthogonal transform coefficients 69 and outputs orthogonal transform quantization coefficients 72.

The quantization step-size computing portion 73 calculates the quantization step size 71 from an amount 75 of codes remained in the code memory 74 in accordance with a method as will be described below.

The method of calculating the quantization step size 71 used in this prior art system will be described in detail hereinbelow.

In this prior art system, a picture represented by the input television signal is composed of 352 columns and 288 rows (i.e., 352 pixels in each row and 288 lines in the vertical direction) and is divided into blocks each of which is referred to as a Macro Block and is composed of 16 columns and 16 rows (i.e., 16 pixels in each row and 16 lines in the vertical direction), as illustrated in FIG. 2. The quantization step size Qb is calculated from the following equation (1) at regular intervals on n Macro Blocks (n is a predetermined positive integer) when the quantization is effected.

$$Qb = 2 \times INT[Bcont \div 200q] + 2 \qquad (1)$$

where (a) INT[*] is defined as a function of rounding a part after the decimal point of an argument * down (e.g., INT[1.5]=1, INT[1.3]=1, INT[1.6]=1), (b) Bcont represents the amount of the code remained in the code memory portion 74 and (c) q represents a coding rate parameter defined by the equation (2) using the coding rate V:

$$V = q \times 64K \text{ bits/second} \qquad (2)$$

(e.g., q=1 if V=64K bits/second).

As is apparent from the equation (1), when the amount of the remained code Bcont increases, the quantization step size Qb also increases so as to limit an amount of generated codes and achieve the coding of video signals at a constant frame rate. For instance, if the amount of the remained code Bcont=700 bits, the quantization step size Qb=8. Further, if the amount of the remained code Bcont=6100 bits, the quantization step size Qb=62. Incidentally, the quantization is performed by using a predetermined quantization step size Qb with respect to a first Macro Block to a (n−1)th Macro Block. For example, the Qb is set to be 32 in case where V=64K bits/sec. and q=1.

In this prior art system, the value of n representing an interval of the calculations of the quantization step size is set to be 12.

The inverse orthogonal transform portion 76 performs the inverse orthogonal transform of the orthogonal transform quantization coefficients 72 and outputs a quantization-error-containing orthogonal transform signal 77 representing the result of the inverse orthogonal transform.

Further, the switching portion 66 selects a numerical-value-zero signal 80 as a reproduced picture calculating signal 79 in case where the coding method selection signal 61 selects the intraframe coding method. In contrast, the switching portion 66 selects the prediction signal 63 as the reproduced picture calculating signal 79 in case where the coding method selection signal 61 selects the interframe coding method.

Then, the reproduced picture calculating portion 78 adds the reproduced picture calculating signal 79 and the quantization-error-containing orthogonal transform signal 77 and outputs a reproduced picture signal 81 representing a reproduced picture of the coding block. Further, the picture memory 44 stores the reproduced picture signal 81 of the current frame and outputs the reproduced television signal (hereunder sometimes referred to as the reproduced picture signal) 55 of the previous frame. Moreover, the prediction error coding portion 82 performs the coding of the orthogonal transform quantization coefficients 72, a signal indicating the quantization step size 71 and the coding method selection signal 61 and outputs a prediction error code 83. Incidentally, the coding of the quantization step size 71 is performed only when the quantization step size 71 changes, namely, is performed only once every n Marco Blocks.

Furthermore, the motion vector coding portion 84 performs the coding of the motion vector signal 56 and calculates a motion vector code 85. Thereafter, the multiplexer portion 86 calculates a transmission frame 87, which has a predetermined format, from the prediction error code 83 and the motion vector 85. Subsequently, the code memory portion 74 stores the transmission frame 87 once and further outputs the transmission frame 87 from the output terminal 89 in synchronization with a clock signal, which is inputted from an external circuit (not shown), as a transmission code 88. Simultaneously, the code memory portion 74 calculates an amount of codes remained therein and outputs a signal indicating the calculated amount of the remained codes.

However, in this prior art system constructed as above described, the quantization step size Qb is fixed during an interval of blocks (n blocks (i.e., n Marco Blocks) in case of this prior art system) at which the calculation of the quantization step size is calculated.

That is, prediction errors are quantized by using the same quantization step size Qb during the continuous n blocks independently of characteristics of the input television signals. More particularly, during the interval at which the calculation of the quantization is calculated, of the continuous blocks, a block having a fine pattern or texture and another block having a coarse pattern are quantized by using the same quantization step size Qb. Thus, the prior art system has a first drawback that the picture quality of the block having a fine patter is degraded, namely, what is called a "block distortion", which is a phenomenon that the block loses the fineness of the pattern thereof and comes to have a flat pattern, occurs due to the quantization of a prediction error generated from the block having a fine pattern and is visually perceived as degradation in picture quality.

Further, similarly, the quantized orthogonal transform coefficients are quantized by using the same quantization step size Qb during the continuous n blocks independently of characteristics of the input television signals. That is during the interval at which the calculation of the quantization is calculated, of the continuous blocks, a block having a fine pattern, which should be coded by using the interframe coding method, and another block having a coarse pattern are quantized by using the same quantization step size Qb. Thus, the prior art system has another similar drawback (hereunder referred to as a second drawback) that the picture quality of the block, which should be coded by the interframe coding method, having a fine patter is degraded, namely, the "block distortion" occurs due to the quantization of orthogonal transform coefficients generated from the block having a fine pattern and is visually perceived as degradation in picture quality.

On the other hand, in order to reduce the amount of the codes generated by coding the quantization step size, the number of the continuous blocks quantized by using the same quantization step size needs to be more than a predetermined number, which is n in case of the above described prior art system. Thus, practically, it is not possible that the quantization step size is calculated or changed every block. The present invention is created to obviate the above described drawbacks of the prior art system.

SUMMARY OF THE INVENTION

It is therefore a first object of the present invention to eliminate the first drawback of the prior art system, namely, to provide a motion compensated prediction interframe coding system which can improve the picture quality by calculating a second quantization step size for each block from a reference (i.e., a first quantization step size), which is calculated from an amount of generated codes as proportional to the visual fineness of each of the continuous blocks to be quantized by using the first quantization step size, and further quantizing the prediction error signals by using the second quantization step size, namely, by employing a second quantization step size, which is smaller than the first quantization step size, for the quantization of a block having a fine pattern to limit the amount of the generated codes and maintain the fineness of the block and to thereby improve the picture quality of the block having a fine pattern, as well as the picture quality of an entire picture.

To achieve the foregoing first object and in accordance with a first aspect of the present invention, there is provided a motion compensated prediction interframe coding system which comprises an analog-to-digital conversion means for performing an analog-to-digital conversion of a television signal, a block dividing means for dividing a predetermined area of the television signal digitalized by the analog-to-digital conversion means into blocks each having a predetermined size, a motion vector calculating means for calculating a motion vector, which represents a motion of a television picture represented by the television signal, of each block and for judging with respect to each whether or not the motion compensation is performed by using by the motion vector, a motion compensation means for performing a motion compensation of a reproduced picture signal of a previous frame with respect to each block of which the motion compensation is determined by the motion vector calculating means to be effected and for calculating predicted gray levels of pixels of each block of which the motion compensation is effected, a prediction error evaluating means for computing the difference between the gray level of each pixel of a coding block of the television picture and the predicted gray level thereof as a prediction error thereof, an orthogonal transform means for performing an orhtogonal transform of the prediction error of each pixel of a coding block of the television picture so as to obtain orthogonal transform coefficients;

a first quantization step-size computing means for computing a first step size for the quantization from an amount of generated codes, a variance calculating means for calculating a variance of the gray levels of the pixels of each block of input television signal, a second quantization step-size computing means for classifies the blocks into a predetermined number of classes according to the variance and computing a second step size for the quantization of each block from the first step size, a quantization means for quantizing coefficients of an orthogonal transform by using the second step size to obtain quantized coefficients of orthogonal transform, an orthogonal transform coefficient coding means for performing the coding of the prediction error, the first step size and information on the classes and the quantized coefficients of the orthogonal transform, a quantized prediction error calculating means for effecting an inverse orthogonal transform of the quantized coefficients of the orthogonal transform to obtain quantized prediction errors, a reproduced picture calculating means for calculating a reproduced picture from the quantized prediction errors and the predicted gray levels of the pixels of the blocks, a memory portion for storing the reproduced picture and a motion vector coding means for performing the coding of the motion vectors.

Incidentally, the fineness of the pattern of a block of the input television signal is considered as can be represented by a variance $\sigma^2$ of gray levels or brightness of pixels contained in the block. Therefore, for example, the variance $\sigma^2$ of gray levels of pixels of a block having a fine pattern is considered as smaller than that of gray levels of pixels of a block having a coarse pattern in which the gray level radically changes among pixels. Further, it can be considered that the higher the fineness of the pattern of a block, the smaller the variance of the gray levels of the pixels of the block becomes.

Thus, the motion compensated prediction interframe coding system according to the first aspect of the present invention can limit the amount of the generated codes and improve the picture quality of a block having a fine pattern by measuring the fineness of patterns of blocks of the input television signal in terms of the variance $\sigma^2$ of the gray level and quantizing the prediction error signals by use of a second quantizing step size, which is obtained by multiplying the first quantization step size a value proportional to the fineness of patterns of blocks in such a manner to be smaller than the first quantization step size, for the quantization of a block, which has a fine pattern, other than blocks to be quantized by using the first quantization step size among the continuous blocks.

Further, it is a second object of the present invention to eliminate the second drawback of the prior art system, namely, to provide a motion compensated prediction interframe coding system which can improve the picture quality by calculating a second quantization step size for blocks to be coded by using the intraframe coding method from a reference (i.e., a first quantization step size), which is calculated from an amount of generated codes as proportional to the visual fineness of the blocks to be coded by using the intraframe coding method and further quantizing the orthogonal transform coefficients by using the second quantization step size, namely, by employing a second quantization step size, which is smaller than the first quantization step size, for the quantization of a block having a fine pattern to limit the amount of the generated codes and maintain the fineness of the block and to thereby improve the picture of the block having a fine pattern, as well as the picture quality of an entire picture.

To achieve the foregoing second object and in accordance with a second aspect of the present invention, there is provided a motion compensated prediction interframe coding system which comprises an analog-to-digital conversion means for performing an analog-to-digital conversion of a television signal, a block dividing means for dividing a predetermined area of the television signal digitalized by the analog-to-digital conversion means into blocks each having a predetermined size, a motion vector calculating means for calculating a motion vector, which represents a motion of a television picture represented by the television signal, of each block and for judging with respect to each block whether or not the motion compensation is performed by using by the motion vector, a motion compensation means for performing a motion compensation of a reproduced picture signal of a previous frame with respect to each block of which the motion compensation is determined by the motion vector calculating means to be effected and for calculating predicted gray levels of pixels of each block of which the motion compensation is effected, a prediction error evaluating means for computing the difference between the gray level of each pixel of a coding block of the television picture and the predicted gray level thereof as a prediction error thereof, a coding method selection means for selecting a method of coding of a block from an interframe coding and interframe coding methods, a first switch means for selecting a signal, of which an orthogonal transform is effected, in accordance with the selection made by the coding method selecting means from the gray levels of pixels of blocks represented by the television signal and the prediction errors, an orthogonal transform means for performing an orthogonal transform of the prediction error or the gray levels selected by the first switch means, a first quantization step-size computing means for computing a first step size for the quantization from an amount of generated codes, a variance calculating means for calculating a variance of the gray levels of the pixels of each block of input television signal, a second quantization step-size computing means for classifying the blocks into a predetermined number of classes according to the variance and computing a second step size for the quantization of each block from the first step size in case of the blocks to be coded by using an intra-frame coding method and for treating the first step sizes as the second step sizes in case of the blocks to be coded by using an interframe coding method, a quantized transform coefficient calculating means for quantizing coefficients of an orthogonal transform by using the second step size to obtain quantized coefficients of an orthogonal transform, an orthogonal transform coefficient coding means for performing information on the selection of the coding methods, the coding of the prediction error, the first step size and information on the classes and the quantized coefficients of the orthogonal transform, an inverse quantization means for effecting an inverse orthogonal transform of the quantized coefficients of the orthogonal transform to obtain inversely-quantized values, a second switch means for selecting a numerical value of zero as a gray level of a pixels of a reproduced picture in case where the coding method selection means selects the intraframe coding method and in contrast, selects the predicted value as the gray level of a pixel of the reproduced picture in case where the coding method selection means selects the interframe coding method, a reproduced picture calculating means for calculating a reproduced picture from the inversely-quantized values and the numerical value of zero or from the predicted gray levels of the pixels of the blocks, a memory portion for storing the reproduced picture and a motion vector coding means for performing the coding of the motion vectors.

As above described, the fineness of the pattern of a block of the input television signal is considered as can be represented by a variance $\sigma^2$ of gray levels or brightness of pixels contained in the block.

Therefore, the motion compensated prediction interframe coding system according to the second aspect of the present invention can limit the amount of the generated codes and improve the picture quality of a block, which should be coded by using the intraframe coding method and has a fine pattern, by measuring the fineness of patterns of blocks of the input television signal in terms of the variance $\sigma^2$ of the gray level and quantizing the orthogonal transform coefficients by use of a second quantization step size, which is obtained by multiplying the first quantization step size a value proportional to the fineness of patterns of blocks in such a manner to be smaller than the first quantization step size, for the quantization of a block, which should be code by the using intraframe coding method and has a fine pattern, other than blocks to be quantized by using the first quantization step size among the continuous blocks.

Moreover, it is a third object of the present invention to eliminate the second drawback of the prior art system, namely, to provide a motion compensated prediction interframe coding system which can maintain the fineness of an original picture and thereby improve the picture quality of the reproduced picture.

To achieve the foregoing third object and in accordance with a third aspect of the present invention, there is provided a motion compensated prediction interframe coding system which comprises an analog-to-digital conversion means for performing an analog-to-digital conversion of a television signal, a block dividing means for dividing a predetermined area of the television signal digitalized by the analog-to-digital conversion means into blocks each having a predetermined size, a motion vector calculating means for calculating a motion vector, which represents a motion of a television picture represented by the television signal, of each block and for judging with respect to each block whether or not a motion compensation prediction is performed by using by the motion vector, a motion compensation predicting means for performing a motion compensation prediction of a reproduced picture signal of a previous frame with respect to each block of which the motion compensation prediction is determined by the motion vector calculating means to be effected and for calculating predicted gray levels of pixels of each block of which the motion compensation prediction is effected, a prediction error evaluating means for computing the difference between the gray level of each pixel of a coding block of the television picture and the predicted gray level thereof as a prediction error thereof, a coding method selection means for selecting a method of coding of a block from an interframe coding and interframe coding methods, a first switch means for selecting a signal, of which an orthogonal transform is effected, in accordance with the selection made by the coding method selecting means from the gray levels of pixels of blocks represented by the television signal and the prediction errors, an orthogonal transform means for performing an orthogonal transform of the prediction error or the gray levels selected by the first switch means, a first quantization step-size computing means for computing a first step size for the quantization from an amount of generated codes, an average and variance calculating means for calculating an averaged value and a variance of the gray levels of the pixels of each block of input television signal, a second quantization step-size computing means for classifying the blocks into a predetermined number of classes according to the averaged value and variance and computing a second step size for the quantization of each block from the first step size in case of the blocks to be coded by using an intra-frame coding method and for treating the first step sizes as the second step sizes in case of the blocks to be coded by using an interframe coding method, a quantized transform coefficient calculating means for quantizing coefficients of an orthogonal transform by using the second step size to obtain quantized coefficients of an orthogonal transform, an orthogonal transform coefficient coding means for performing information on the selection of the coding methods, the coding of the prediction error, the first step size and information on the classes and the quantized coefficients of the orthogonal transform, an inverse quantization means for effecting an inverse orthogonal transform of the quantized coefficients of the orthogonal transform to obtain inversely-quantized values, a second switch means for selecting a numerical value of zero or the predicted gray level obtained by the motion compensation prediction as a gray level of a pixels of a reproduced picture according to the selection made by the coding method selection means, a reproduced picture calculating means for calculating a reproduced picture from the inversely-quantized values and the numerical value of zero or from the predicted gray levels of the pixels of the blocks, a memory portion for storing the reproduced picture and a motion vector coding means for performing the coding of the motion vectors.

As stated above, the fineness of the pattern of a block of the input television signal is considered as can be represented by a variance $\sigma^2$ of gray levels of pixels contained in the block.

Further, in case where the averaged value of the the gray levels of pixels of a block is a certain value, this block may not visually be striking even if the variance of the gray levels of the pixels of this block is small and the fineness of the pattern of this block is high.

Therefore, the motion compensated prediction interframe coding system according to the second aspect of the present invention can limit the amount of the generated codes and improve the picture quality of a block, which should be coded by using the intraframe coding method and has a fine pattern and of which the averaged value of gray levels of pixels is greater or equal to a predetermined value, by measuring the fineness of a pattern of each block of the input television signal in terms of the variance $\sigma^2$ of the gray level and quantizing the orthogonal transform coefficients by use of a second quantization step size, which is obtained by multiplying the first quantization step size a value proportional to the fineness of patterns of blocks in such a manner to be smaller than the first quantization step size, for the quantization of a block, which should be code by the using intraframe coding method and has a fine pattern, other than blocks to be quantized by using the first quantization step size among the continuous blocks.

Furthermore, it is a fourth object of the present invention to eliminate the second drawback of the prior art system, namely, to provide a motion compensated prediction interframe coding system which can improve the picture quality by calculating a second quantization step size for each block (hereunder sometimes referred to as luminance signal block), which is to be coded by using the intraframe coding method and respectively corresponds to a part of a luminance signal and of which the averaged value of the gray levels of corresponding pixels is equal to or more than a predetermined value, from a reference (i.e., a first quantization step size), which is calculated from an amount of generated codes as proportional to the visual fineness of the blocks to be coded by using the intraframe coding method and further quantizing the orthogonal transform coefficients by using the second quantization step size, namely, by employing a second quantization step size, which is smaller than the first quantization step size, for the quantization of a luminance signal block, of which the averaged value of gray levels of corresponding pixels is equal to or more than a predetermined value and the fineness is high, to limit the amount of the generated codes, to maintain the fineness of the original picture and to thereby improve the picture quality of the blocks, and which can prevent discoloration of a coding block, which is due to the fact that an amount of codes corresponding to a color difference signal is extremely small, by reducing the amount of codes corresponding to the luminance signal and increase an amount of codes corresponding to the color difference signal by modifying a threshold value for evaluating the second quantization step size when the first quantization step size is equal to or more than a predetermined value, thereby improving the picture quality of the entire reproduced picture.

To achieve the foregoing fourth object and in accordance with a fourth aspect of the present invention, there is provided a motion compensated prediction interframe coding system which comprises an analog-to-digital conversion means for performing an analog-to-digital conversion of a television signal, a block dividing means for dividing a predetermined area of the television signal digitalized by the analog-to-digital conversion means into blocks each having a predetermined size, a motion vector calculating means for calculating a motion vector, which represents a motion of a television picture represented by the television signal, of each block and for judging with respect to each block whether or not a motion compensation prediction is performed by using by the motion vector, a motion compensation predicting means for performing a motion compensation prediction of a reproduced picture signal of a previous frame with respect to each block of which the motion compensation prediction is determined by the motion vector calculating means to be effected and for calculating predicted gray levels of pixels of each block of which the motion compensation prediction is effected, a prediction error evaluating means for computing the difference between the gray level of each pixel of a coding block of the television picture and the predicted gray level thereof as a prediction error thereof, a coding method selection means for selecting a method of coding of a block from an interframe coding and interframe coding methods, a first switch means for selecting a signal, of which an orthogonal transform is effected, in accordance with the selection made by the coding method selecting means from the gray levels of pixels of blocks represented by the television signal and the prediction errors, an orthogonal transform means for performing an orthogonal transform of the prediction error or the gray levels selected by the first switch means; a first quantization step-size computing means for computing a first step size for the quantization from an amount of generated codes, an average and variance calculating means for calculating an averaged value and a variance of the gray levels of the pixels of each block of input television signal, a threshold value modifying means for modifying predetermined threshold values according to the first step size to classify blocks, which are repressented by luminance signals and are to be coded by effecting the intraframe coding method, into a predetermined number of classes, a second quantization step-size computing means for classifying the blocks, which are represented by luminance signals and are to be coded by effecting the intraframe coding method, into the predetermined number of classes according to the averaged value and variance and computing a second step size for the quantization of each block from the first step size in case of the blocks to be coded by using an intraframe coding method and for treating the first step sizes as the second step sizes in case of the blocks to be coded by using an interframe coding method, a quantized transform coefficient calculating means for quantizing coefficients of an orthogonal transform by using the second step size to obtain quantized coefficients of an orthogonal transform, an orthogonal transform coefficient coding means for performing information on the selection of the coding methods, the coding of the prediction error, the first step size and information on the classes and the quantized coefficients of the orthogonal transform, an inverse quantization means for effecting an inverse orthogonal transform of the quantized coefficients of the orhtogonal transform to obtain inversely-quantized values, a second switch means for selecting a numerical value of zero, or the predicted gray level obtained by the motion compensation prediction as a gray level of a pixels of a reproduced picture according to the selection made by the coding method selection means, a reproduced picture calculating means for calculating a reproduced picture from the inversely-quantized values and the numerical value of zero or from the predicted gray levels of the pixels of the blocks, a memory portion for storing the reproduced picture; and a motion vector coding means for performing the coding of the motion vectors.

As above-mentioned, the fineness of the pattern of a block of the input television signal is considered as can be represented by a variance $\sigma^2$ of gray levels of pixels contained in the block. Further, in case where the averaged value of the gray levels of pixels of a block is a certain value, this block may not visually be striking even if the variance of the gray levels of the pixels of this block is small and the fineness of the pattern of this block is high.

Thus, the motion compensated prediction interframe coding system according to the fourth aspect of the present invention can limit the amount of the generated codes and improve the picture of a block, which should be coded by using the intraframe coding method and has a fine pattern and of which the averaged value of gray levels of pixels is greater or equal to a predetermined value, by measuring the fineness of a pattern of each block of the luminance signal contained in the input television signal in terms of the variance $\sigma^2$ of the gray level and quantizing the orthogonal transform coefficients by use of a second quantization step size, which is obtained by multiplying the first quantization step size a value proportional to the fineness of patterns of blocks according to a threshold value modified on the basis of the averaged value of the pixels of the blocks, the variance of the gray level and the first quantization step size in such a manner to be smaller than the first quantization step size, for the quantization of a block, which should be code by the using intraframe coding method and has a fine pattern, other than blocks to be quantized by using the first quantization step size among the continuous blocks.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

BRIEF DESCRIPTION OF THE PREFERRED EMBODIMENTS

Hereinafter, the preferred embodiments of the present invention will be described in detail by referring to the accompanying drawings.

Figure 3:
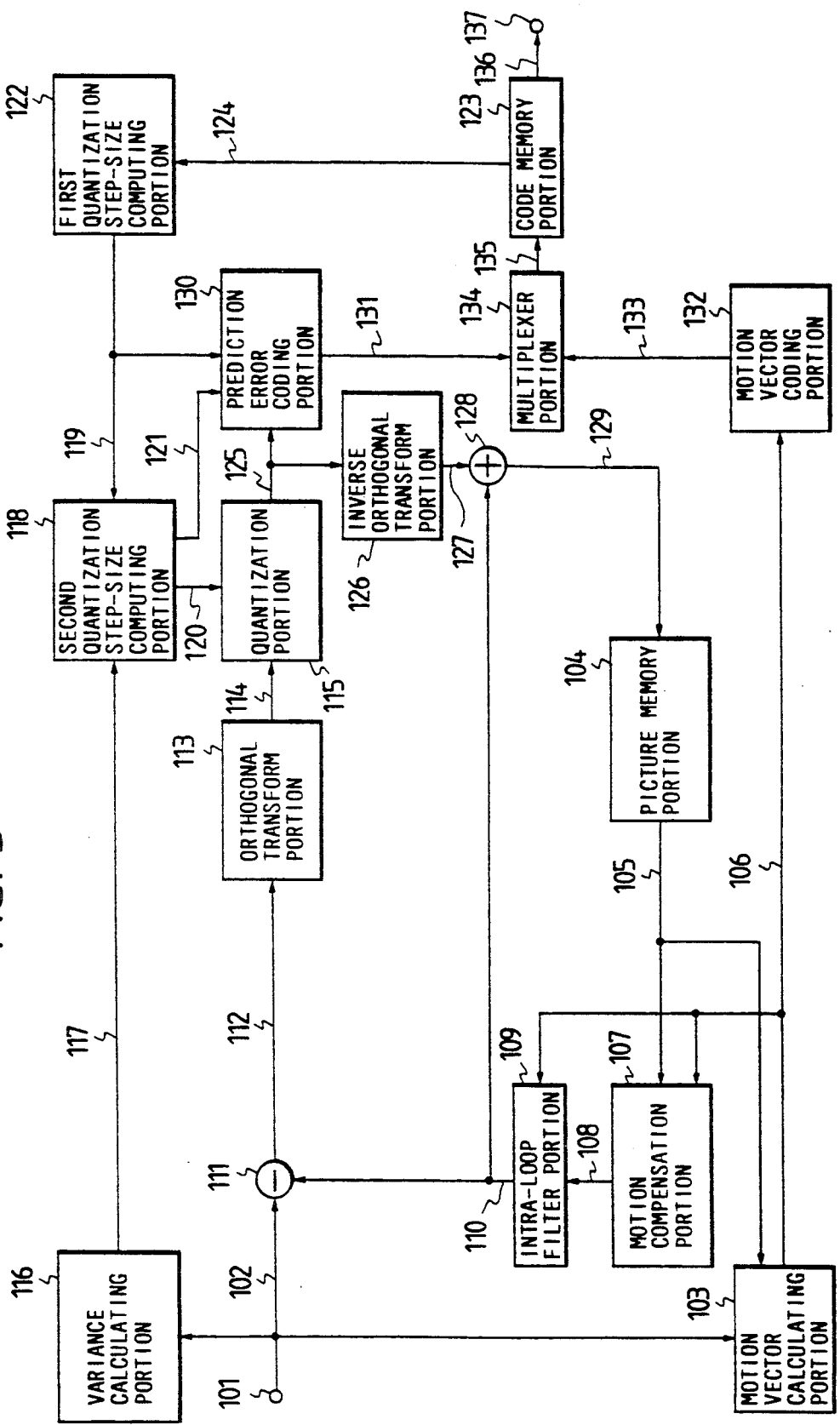
FIG. 3 is a schematic block diagram for showing a first motion compensated prediction interframe coding system embodying the present invention.

First, a first embodiment of the present invention will be described hereinbelow with reference to FIG. 3.

In this figure, reference numeral 101 designates an input terminal from which television signals are inputted to the system; 103 a motion vector calculating portion for comparing a picture signal of a coding block of a current frame with a reproduced picture signal of a previous frame and calculating a motion vector; 104 a picture memory portion for storing reproduced picture signals of a current and previous frames; 107 a motion compensation portion for performing a motion compensation of the reproduced picture signals of the previous frame; 109 an intra-loop filter portion for performing two-dimensional lowpass filtering processing of a motion compensation predicting signal; 111 a prediction error evaluating portion for evaluating a prediction error by computing the difference between an original picture signal and a predictive signal of a coding block; 113 an orthogonal transform portion for performing an orthogonal transform of the prediction error signal; 115 a quantization portion for quantizing coefficients of an orthogonal transform; 116 a variance calculating portion for calculating a variance of the input television signal; 118 a second quantization step-size computing portion for computing a second step size for the quantization; 122 a first quantization step-size computing portion for computing a first step size for the quantization; 123 a code memory portion for temporarily storing a transmission frame; 126 an inverse orthogonal transform portion for effecting an inverse orthogonal transform of the quantized orthogonal transform coefficients; 128 a reproduced picture calculating portion for calculating a reproduced picture of a current frame; 130 a prediction error coding portion for performing what is called "transmitting channel coding" of a prediction error, the first quantization step size and quantization class information; 132 a motion vector coding portion for performing the transmitting channel coding of a motion vector; 134 a multiplexer portion for computing a transmitting frame on the basis of the prediction code and the coded motion vector (hereunder sometimes referred to as the motion vector code); and 137 an output terminal from which a transmission signal is output.

Hereinafter, an operation of this motion compensated prediction interframe coding system having the above described arrangement will be described.

First, television signals are converted into digital television signals by an analog-to-digital (A/D) conversion circuit (not shown). Then, pixels represented by the digital television signals are divided into blocks each of which is a rectangular array composed of M×N pixels arranged in M columns and N rows. Further, the digital television signals are input to the system from the input terminal 101 as input television signals 102. Then, the motion vector calculating portion 103 compares the input television signal 102 with a reproduced picture signal 105 of a previous frame stored in the picture memory portion 104 and calculating the motion of a coding block as a motion vector and moreover outputs a motion vector signal 106 representing the motion vector. Simultaneously, the motion vector calculating portion 103 judges from the result of the evaluation of the motion vector whether the motion compensation made with respect to the coding block is effective or ineffective. Further, the motion vector calculating portion 103 outputs motion compensation control information signal which represents the result of the judgement and is superposed on the motion vector signal 106.

A motion compensation portion 107 performs a motion compensation of the reproduced television signal 105 of a previous frame corresponding to the coding lock in case where the motion compensation control information signal indicates that the motion compensation is effective (i.e., the motion compensation is effected by using the motion vector signal) and outputs the reproduced television signal without change as a motion compensation signal 108 in case where the motion compensation control information signal indicates that the motion compensation prediction is ineffective (i.e., the motion compensation should not be effected).

Then, the intra-loop filtering portion 109 performs the two dimensional lowpass filtering processing of a coding block of which the motion compensation is effected by using the motion vector and further outputs a prediction signal 110.

Subsequently, the prediction error evaluating portion 111 evaluates the difference between the input television signal 102 and the prediction signal 110 of the coding block and outputs a prediction error signal 112 representing the evaluated difference. Further, the orthogonal transform portion 113 performs the orthogonal transform of the signal 112 to remove therefrom effects of the high-degree correlation between each pair of the neighbors of a pixel corresponding to the signal 112 and further outputs a prediction error orthogonal transform coefficient signal 114 representing prediction error orthogonal transform coefficients. At that time, the discrete cosine transform (DCT), which has a high efficiency of transform and of which firmware may be realized as described above, is usually employed as the orthogonal transform.

Hereunder, will be described a method for calculating the second quantization step size 120 which is used to quantize the prediction error orthogonal transform coefficients 114.

The variance calculating portion 116 calculates a variance $\sigma^2$ of the input television signal of the coding block from the following equation (3) and outputs a variance signal 117 representing the calculated variance. Further, the variance $\sigma^2$ is small in case where the fineness of a block represented by the input television signal 102 is high, while the variance $\sigma^2$ is large in case where the fineness of a block represented by the input television signal 102 is low.

$$\sigma^2 = (1/(M \times N)) \sum_{i=1}^{M} \sum_{j=1}^{N} (p(i,j) - P)^2 \quad (3)$$

where M represents the number of columns (or pixels on a row) of a block; N the number of rows of the block; p(i,j) a gray level of a pixel at an address (i,j) in the block; and P the averaged value of the gray levels of the pixels of the block (see the following equation (4)).

$$P = (1/M \times N) \sum_{i=1}^{M} \sum_{j=1}^{N} p(i,j) \quad (4)$$

Further, the second quantization step size calculating portion 118 generates a second quantization step size signal 120 representing second quantization step size and a quantization class information signal 121 representing the quantization class information. The first quantization step size calculating portion 122 obtains the first quantization step size from an amount of codes remained in the code memory portion 123 by using the above described method, which is employed for calculating the quantization step size in the prior art system, and outputs a first quantization step size signal 119 representing the first quantization step size.

As will be described below, the second quantization step size calculating portion 118 compares the variance represented by the variance signal 117 with each of three threshold values th1, th2 and th3 to divide each block into four quantization classes. Further, the second quantization step size represented by the second quantization step size signal 120 for each block obtained from the first quantization step size represented by the first quantization step size signal 119. Incidentally, let Qb denote the first quantization step size; and Qstep the second quantization step size.

① In case where $0 \leq \sigma^2 < th1$, the class No. (Qstep Class)=1 and Qstep=(¼)Qb;

② In case where $th1 \leq \sigma^2 < th2$, Qstep Class=2 and Qstep=(2/4)Qb;

③ In case where $th2 \leq \sigma^2 < th3$, Qstep Class=3 and Qstep=(¾)Qb; and

④ In case where $th3 \leq \sigma^2$, Qstep Class=4 and Qstep=Qb.

Thereby, for a block having a fine pattern or texture, the second quantization step size is made to become smaller than the first quantization step size.

Then, the quantization portion 115 quantizes the prediction error orthogonal transform coefficients 114 by using the second quantization step size 120 to obtain orthogonal transform quantization coefficients and outputs an orthogonal transform quantization coefficient signal 125 representing the orthogonal transform quantization coefficients. Further, the inverse orthogonal transform portion 126 performs the inverse orthogonal transform of the prediction error orthogonal transform quantization coefficients 125 and outputs a quantization-error-containing prediction error signal 127 representing the result of the inverse orthogonal transform.

Subsequently, the reproduced picture calculating portion 128 adds the prediction signal 110 and the quantization-error-containing prediction error signal 127 and outputs a reproduced picture signal 129 representing a reproduced picture of the coding block. Further, the picture memory 44 stores the reproduced picture signal 129 of the current frame and outputs the reproduced picture signal 105 of the previous frame. Moreover, the prediction error coding portion 130 performs the coding of the prediction error orthogonal transform quantization coefficients 125, a signal indicating the first quantization step size 119 and the quantization class information 121 and outputs a prediction error code signal 131 representing the prediction error code. Furthermore, the motion vector coding portion 132 performs the coding of the motion vector signal 106 and calculates a motion vector code and a motion vector code signal 133 representing the motion vector code. Thereafter, the multiplexer portion 134 calculates a transmission frame 135, which has a predetermined format, from the prediction error code 131 and the motion vector code 133. Subsequently, the code memory portion 123 stores the transmission frame once and further outputs a transmission frame signal 135 representing the transmission frame from the output terminal 137 in synchronization with a clock signal, which is inputted from an external circuit (not shown), as a transmission code represented by a transmission code signal 136. Simultaneously, the code memory portion 123 calculates an amount of codes remained therein and outputs a remained amount code signal 124 indicating the calculated amount of the remained codes.

As is apparent from the foregoing description, this embodiments calculates the second quantization step size from the first quantization step size as proportional to the fineness of the pattern of each block among a group of continuous blocks, each of which is quantized by using a quantization step size, and quantizes the prediction error of a block having a fine pattern by using the the second quantization step size. Thereby, the picture quality of the reproduced picture can be improved without degrading the fineness of the pattern or texture of the entire picture.

Incidentally, the variance 117 calculated by the variance calculating portion 116 is defined by the equation (3). However, any other kind of a measure may be employed as the variance so long as it can be used to measure the fineness of a picture represented by the input television signal 102. For instance, the following measure D defined by an equation (5) may be employed because the size of a block is generally fixed (namely, the number of pixels on a row is M and that of rows is N) and the calculation thereof can be easily effected.

$$D = (1/(M \times N)) \sum_{i=1}^{M} \sum_{j=1}^{N} |p(i,j) - P| \quad (5)$$

where p(i,j) denotes a gray level of a pixel at an address (i,j) in the block; and P the averaged value of the gray levels of the pixels of the block.

Further, in this embodiment, the number of the classes is four as above described. However, a different number may be employed as the number of the classes.

Additionally, in this embodiment, the second quantization step size Qstep is determined for each class as described in ①~④. Another method for determining the second quantization step size may employed as long as the second quantization step size can be determined by the method to be small for a block having a small variance.

As described above, this embodiment first measures characteristics regarding the fineness of a pattern or texture of each block of picture, which is represented by an input television signal and is divided into a group of continuous blocks each quantized by using a quantization step size, and changes the quantization step size into a smaller one if quantizes a block having a picture pattern or texture finer than patterns of the other blocks. Thereby, an amount of generated codes can be limited but a motion compensated prediction frame coding operation can be performed without degrading the fineness of the texture of the original input picture. Further, the picture quality of the reproduced picture can be improved. Thus, practically, the present invention is very efficacious.

Figure 4:
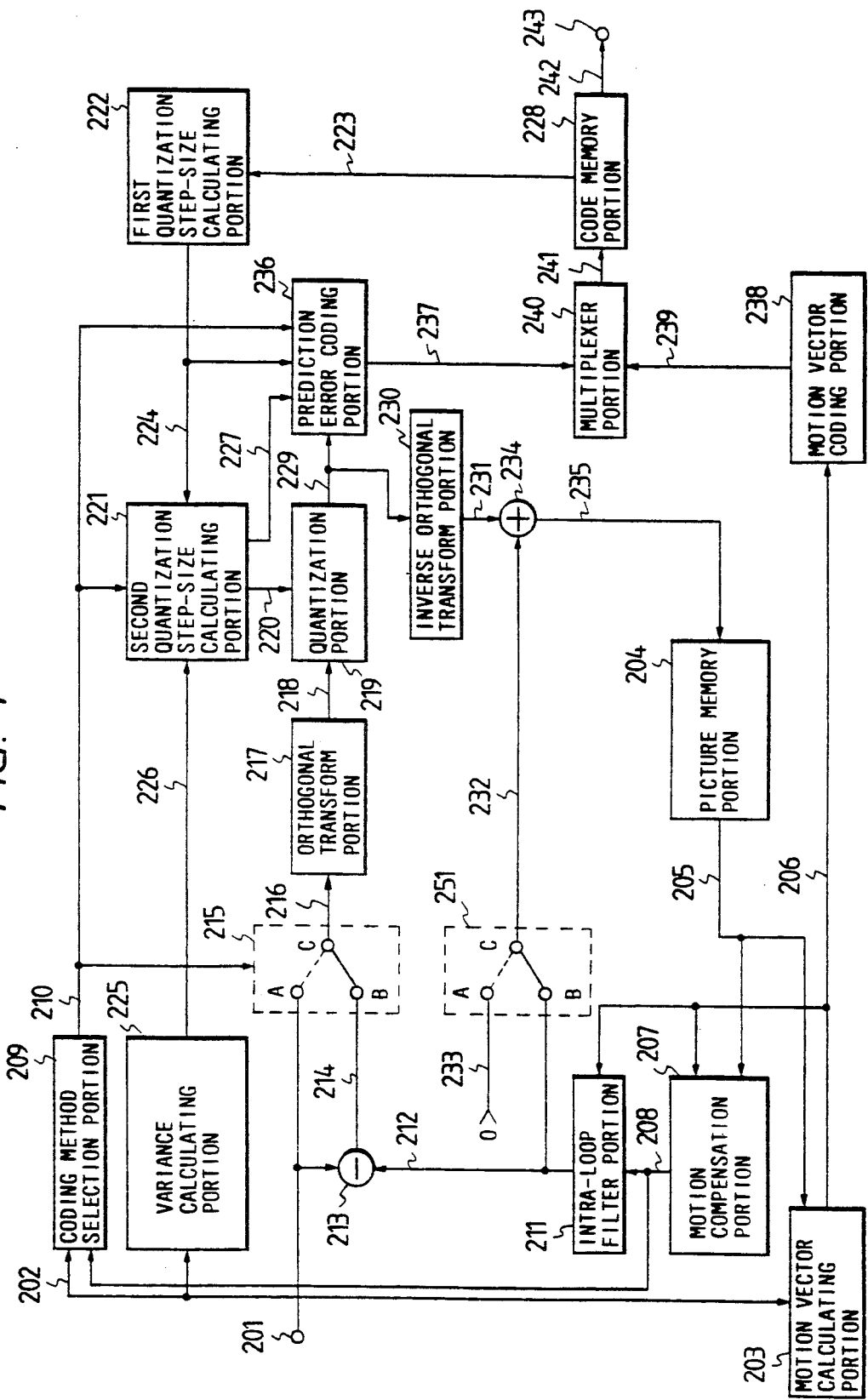
FIG. 4 is a schematic block diagram for showing a second motion compensated prediction interframe coding system embodying the present invention.

Next, a second embodiment of the present invention will be described hereinbelow with reference to FIG. 4.

In this figure, reference numeral 201 designates an input terminal from which television signals are inputted to the system; 203 a motion vector calculating portion for comparing a picture signal of a coding block of a current frame with a reproduced picture signal of a previous frame and calculating a motion vector; 204 a picture memory portion for storing reproduced picture signals of a current and previous frames; 207 a motion compensation portion for performing a motion compensation of the reproduced picture signals of the previous frame; 209 a coding method selection portion for selecting a method of coding of a block from an interframe coding and interframe coding methods; 211 an intra-loop filter portion for performing two-dimensional low-pass filtering processing of a motion compensation signal; 213 a prediction error evaluating portion for evaluating a prediction error by computing the difference between an original picture signal and a predictive signal of a coding block; 215 a switch portion for selecting a signal, of which an orthogonal transform is effected, in accordance with a coding method selecting signal and further selecting a signal from which a reproduced picture is calculated; 217 an orthogonal transform portion for performing an orthogonal transform of the prediction error signal; 219 a quantization portion for quantizing coefficients of an orthogonal transform; 221 a second quantization step-size computing portion for computing a second step size for the quantization; 222 a first quantization step-size computing portion for computing a first step size for the quantization; 225 a variance calculating potion for calculating a variance of the input television signal; 228 a code memory portion for temporarily storing a transmission frame; 230 an inverse orthogonal transform portion for effecting an inverse orthogonal transform of the quantized orthogonal transform coefficients; 234 a reproduced picture calculating portion for calculating a reproduced picture of a current frame; 236 a prediction error coding portion for performing what is called "transmitting channel coding" of a coding method selection signal, a prediction error, the first quantization step size and quantization class information; 238 a motion vector coding portion for performing the transmitting channel coding of a motion vector; 240 a multiplexer portion for computing a transmitting frame on the basis of the prediction code and the motion vector code; and 243 an output terminal from which a transmission signal is output.

Hereinafter, an operation of this motion compensated prediction interframe coding system having the above described arrangement will be described.

First, television signals are converted into digital television signals by an A/D conversion circuit (not shown). Then, pixels represented by the digital television signals are divided into blocks each of which is a rectangular array composed of $M \times N$ pixels arranged in M columns and N rows. Further, the digital television signals are input to the system from the input terminal 201 as input television signals 202. Then, the motion vector calculating portion 203 compares the input television signal 202 with a reproduced picture signal 205 of a previous frame stored in the picture memory portion 204 and calculating the motion of a coding block as a motion vector and moreover outputs a motion vector signal 206 representing the motion vector. Simultaneously, the motion vector calculating portion 203 judges from the result of the evaluation of the motion vector whether the motion compensation made with respect to the coding block is effective or ineffective. Further, the motion vector calculating portion 203 outputs motion compensation control information signal which represents the result of the judgement and is superposed on the motion vector signal 206.

A motion compensation portion 207 performs a motion compensation of the reproduced television signal 205 of a previous frame in case where the motion compensation control information indicates that the motion compensation is effective (i.e., the motion compensation is be effected by using motion vector) and outputs the reproduced television signal without change as a motion compensation signal 208 in case where the motion compensation control information indicates that the motion compensation is ineffective (i.e., the motion compensation should not be effected).

The coding method selection portion 209 compares the input television signal 202 with the motion compensation signal 208 every block and judges whether or not the motion compensation prediction is effective. Further, the coding method selection portion 209 judges that an intraframe coding method is effective for a current block in question in case where the motion compensation prediction is effective and that an interframe coding method is effective for a current block in question in case where the motion compensation prediction is not effective, and outputs a coding method selection signal 210 representing the result of this judgement. Further, in case of a coding system in which it is necessary to insert a refreshment frame between other frames, the portion 209 selects the coding method selection signal 210 in such a manner to code all of the blocks by use of the intra-frame coding method by inserting a refreshment frame between other frames every constant frame period.

Then, the intra-loop filtering portion 211 performs the two-dimensional lowpass filtering processing of the motion compensation signal 208 in case where the motion compensation of a coding block is to be effected by using the motion vector and in another case, outputs the motion compensation signal 208 as a prediction signal 212 without effecting the intra-loop filtering processing.

Subsequently, the prediction error evaluating portion 213 evaluates the difference between the input television signal 202 and the prediction signal 212 of the coding block and outputs a prediction error signal 214 representing the evaluated difference.

Thereafter, in case where the coding method selection signal 210 indicates that the intraframe coding method is selected, the switching portion 215 selects the input television 202 as a signal 216 to be transformed by performing the orthogonal transform. In contrast, in case where the coding method selection signal 210 indicates that the interframe coding method is selected, the switching portion 215 selects the prediction error signal 214 as a signal 216.

Further, the orthogonal transform portion 217 performs the orthogonal transform of the signal 216 to remove therefrom effects of the high-degree correlation between each pair of the neighbors of a pixel corresponding to the signal 216 and further outputs an orthogonal transform coefficient signal 218 representing orthogonal transform coefficients. At that time, the DCT, which has a high efficiency of transform and of which firmware may be realized, is usually employed as the orthogonal transform.

Then, the quantization portion 219 quantizes the orthogonal transform coefficients represented by the signal 218 by using the second quantization step size. Hereinafter, a method of calculating the second quantization step size represented by a second quantization step size signal 220.

Figure 1:
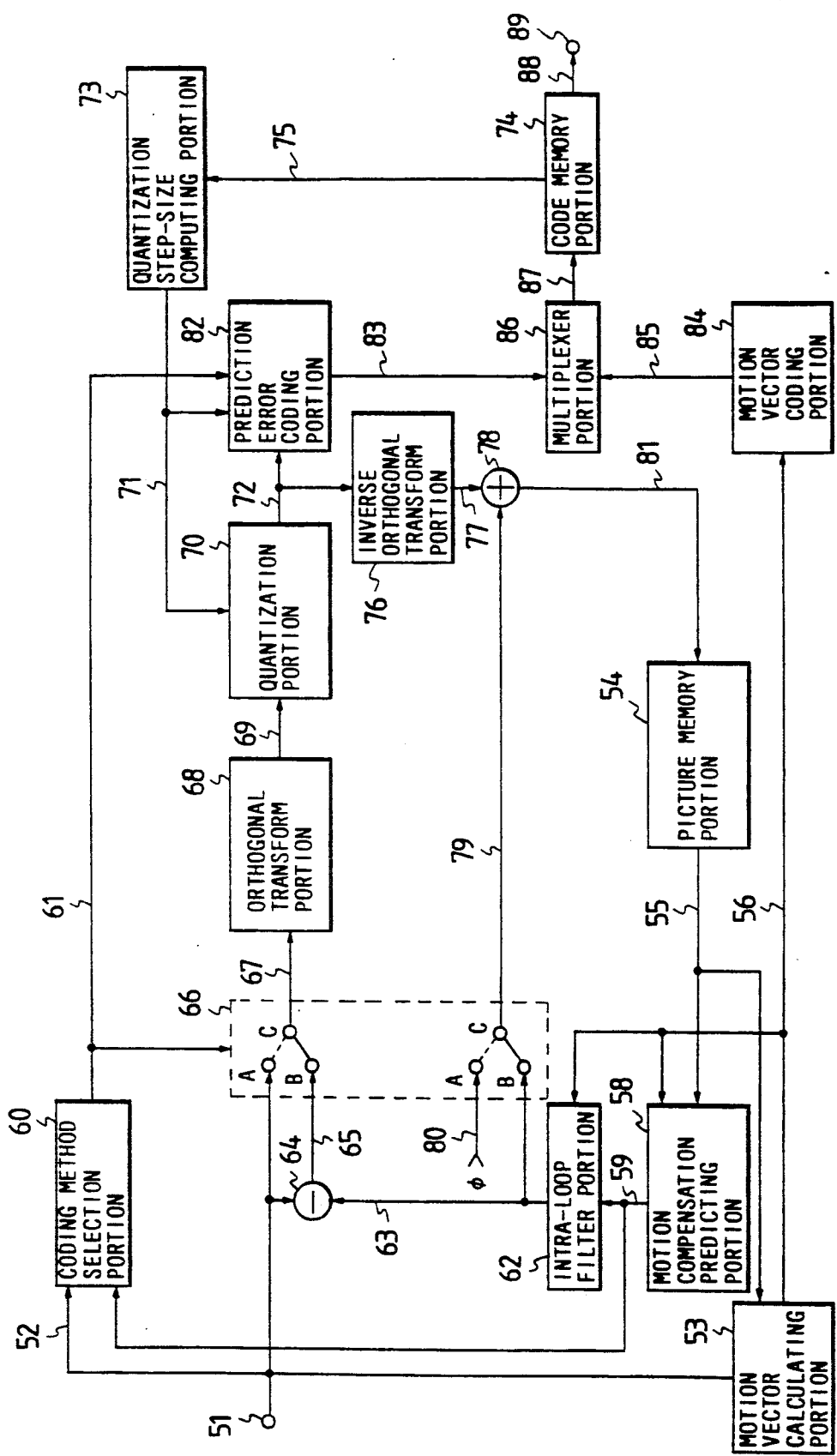
FIG. 1 is a schematic block diagram for showing a prior art motion compensated prediction interframe coding system.
Figure 2:
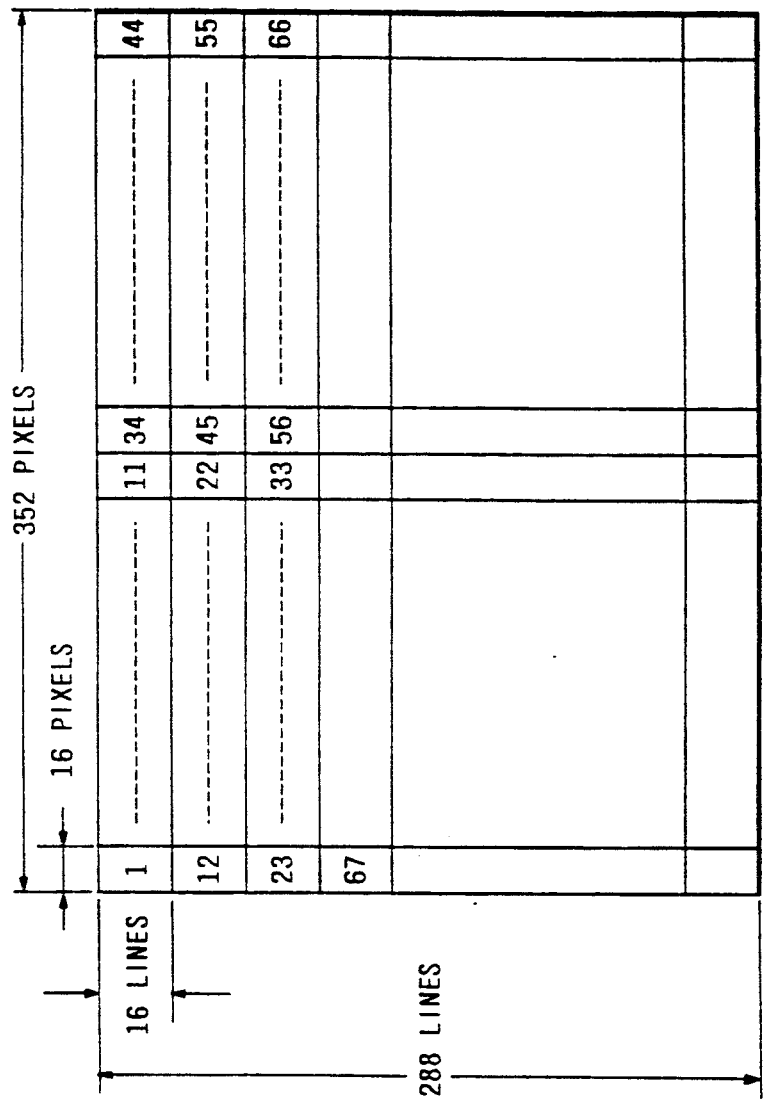
FIG. 2 is a diagram for illustrating the relation between a picture represented by an input television signal and a Macro Block.

(1) In case where a coding block is a block to be coded by the intraframe coding method:

The second quantization step size calculating portion 221 outputs the first quantization step size calculated by the first quantization step size calculating portion 222 from the amount of the remained code 223 by using the method described with reference to FIG. 1 as the second quantization step size.

(2) In case where a coding block is a block to be coded by the interframe coding method:

By effecting a process of steps (i) and (ii) as will be described later, a variance of gray levels of pixels of the coding block is first calculated. Then, the block is divided into classes according to the calculated variance. Further, the second quantization step size actually used in the quantization for each class is calculated from the first quantization step size.

(i) The variance calculating portion 225 calculates a variance $\sigma^2$ of the input television signal 202 of the coding block from the following equation (6) and outputs a variance signal 226 representing the calculated variance. Further, the variance $\sigma^2$ is small in case where the fineness of a block represented by the input television signal 202 is high, while the variance $\sigma^2$ is large in case where the fineness of a block represented by the input television signal 202 is low.

$$\sigma^2 = (1/(M \times N)) \sum_{i=1}^{M} \sum_{j=1}^{N} (p(i,j) - P)^2 \quad (6)$$

where M represents the number of columns (or pixels on a row) of a block; N the number of rows of the block; p(i, j) a gray level of a pixel at an address (i, j) in the block; and P the averaged value of the gray levels of the pixels of the block (given by the following equation (7)).

$$P = (1/(M \times N)) \sum_{i=1}^{M} \sum_{j=1}^{N} p(i,j) \quad (7)$$

(ii) Further, the second quantization step size calculating portion 221 calculates a second quantization step size represented by a second quantization step size signal 220 and the quantization class information represented by a quantization class information signal 227 from the variance signal 226 (hereunder sometimes referred to as the coding block variance signal) corresponding to the coding block and the first quantization step size signal 224. Further, the first quantization step size represented by the signal 224 is obtained by the first quantization step size calculating portion 222 from the amount of the codes remained in the code memory 228 by using the method described with reference to FIG. 1.

The second quantization step size calculating portion 221 compares the variance represented by the variance signal 226 with each of three threshold values th1, th2 and th3 with respect to a block to be coded by using the interframe coding method and divides each block into four quantization classes. Further, the second quantization step size represented by the second quantization step size signal 220 for each block obtained from the first quantization step size represented by the first quantization step size signal 224. Incidentally, let Qb denote the first quantization step size; and Qstep the second quantization step size.

① In case where $0 \leq \sigma^2 < th1$, the class No. (Qstep Class)=1 and Qstep=(¼)Qb;

② In case where $th1 \leq \sigma^2 < th2$, Qstep Class=2 and Qstep=(2/4)Qb;

③ In case where $th2 \leq \sigma^2 < th3$, Qstep Class=3 and Qstep=(¾)Qb; and

④ In case where $th3 \leq \sigma^2$, Qstep Class=4 and Qstep=Qb.

Thereby, the second quantization step size used for quantizing a block to be coded by using the interframe coding method is made to become smaller than the first quantization step size.

Then, the quantization portion 219 quantizes the orthogonal transform coefficients 214 by using the second quantization step size 220 to obtain orthogonal transform quantization coefficients and outputs an orthogonal transform quantization coefficient signal 229 representing the orthogonal transform quantization coefficients. Further, the inverse orthogonal transform portion 230 performs the inverse orthogonal transform of the orthogonal transform quantization coefficients 229 and outputs a quantization-error-containing error signal 231 representing the result of the inverse orthogonal transform.

Further, another switching portion 251 selects a numerical-value-zero signal 233 as a reproduced picture calculated signal 232 in case where the coding method selection signal 210 selects the intraframe coding method. In contrast, the switching portion 216 selects the prediction signal 212 as the reproduced picture calculating signal 232 in case where the coding method selection signal 210 selects the interframe coding method.

Then, the reproduced picture calculating portion 234 adds the reproduced picture calculating signal 232 and the quantization-error-containing orthogonal transform signal 231 and outputs a reproduced picture signal 235 representing a reproduced picture of the coding block. Further, the picture memory 204 stores the reproduced picture signal 235 of the current frame and outputs the reproduced picture signal 205 of the previous frame.

Moreover, the prediction error coding portion 236 performs the coding of the orthogonal transform quantization coefficients represented by the signal 225, a the first quantization step size represented by the signal 224, the quantization class information represented by the signal 227 and the information represented by the coding method selection signal 210 and outputs a prediction error code 237.

Furthermore, the motion vector coding portion 238 performs the coding of the motion vector signal 206 and calculates a motion vector code, which is represented by a motion vector code signal 239.

Thereafter, the multiplexer portion 240 calculates a transmission frame 241, which has a predetermined format, from the prediction error code 237 and the motion vector code 239.

Subsequently, the code memory portion 228 stores the transmission frame 241 once and further outputs the transmission frame 241 from the output terminal 243 in synchronization with a clock signal, which is inputted from an external circuit (not shown), as a transmission code represented by a transmission code signal 242. Simultaneously, the code memory portion 228 calculates an amount of codes remained therein and outputs a signal 223 indicating the calculated amount of the remained codes.

As is apparent from the foregoing description, this embodiments calculates the second quantization step size from the first quantization step size as proportional to the fineness of the pattern of each block among a group of continuous blocks, each of which is quantized by using a quantization step size, and quantizes the prediction error of a block having a fine pattern by using the the second quantization step size. Thereby, the picture quality of the entire reproduced picture can be improved without degrading the fineness of the pattern or texture of the picture.

Incidentally, the variance 226 calculated by the variance calculating portion 225 is defined by the equation (6). However, any other kind of a measure may be employed as the variance so long as it can be used to measure the fineness of a picture represented by the input television signal 102. For example, the following measure D defined by an equation (8) may be employed because the size of a block is generally fixed (namely, the number of pixels on a row is M and that of rows is N) and the calculation thereof can be easily effected.

$$D = (1/(M \times N)) \sum_{i=1}^{M} \sum_{j=1}^{N} |p(i,j) - P| \quad (8)$$

where p(i, j) denotes a gray level of a pixel at an address (i, j) in the block; and P the averaged value of the gray levels of the pixels of the block.

Further, in this embodiment, the number of the classes is four, as above described. However, a different number may be employed as the number of the classes so long as the second quantization step size can be determined to be small for a block having a small variance.

As described above, this embodiment first measures characteristics regarding the fineness of a picture pattern or texture of each block of picture, which is represented by an input television signal and is divided into a group of continuous blocks each quantized by using a quantization step size, and changes the quantization step size into a smaller one when quantizing a block having a fine pattern or texture and to be coded by effecting the intra-frame coding method. Thereby, an amount of generated codes can be limited but a motion compensated prediction frame coding operation can be performed without degrading the fineness of the texture of the original input picture. Further, the picture quality of the reproduced picture can be improved. Therefore, practically, the present invention is very advantageous.

Figure 5:
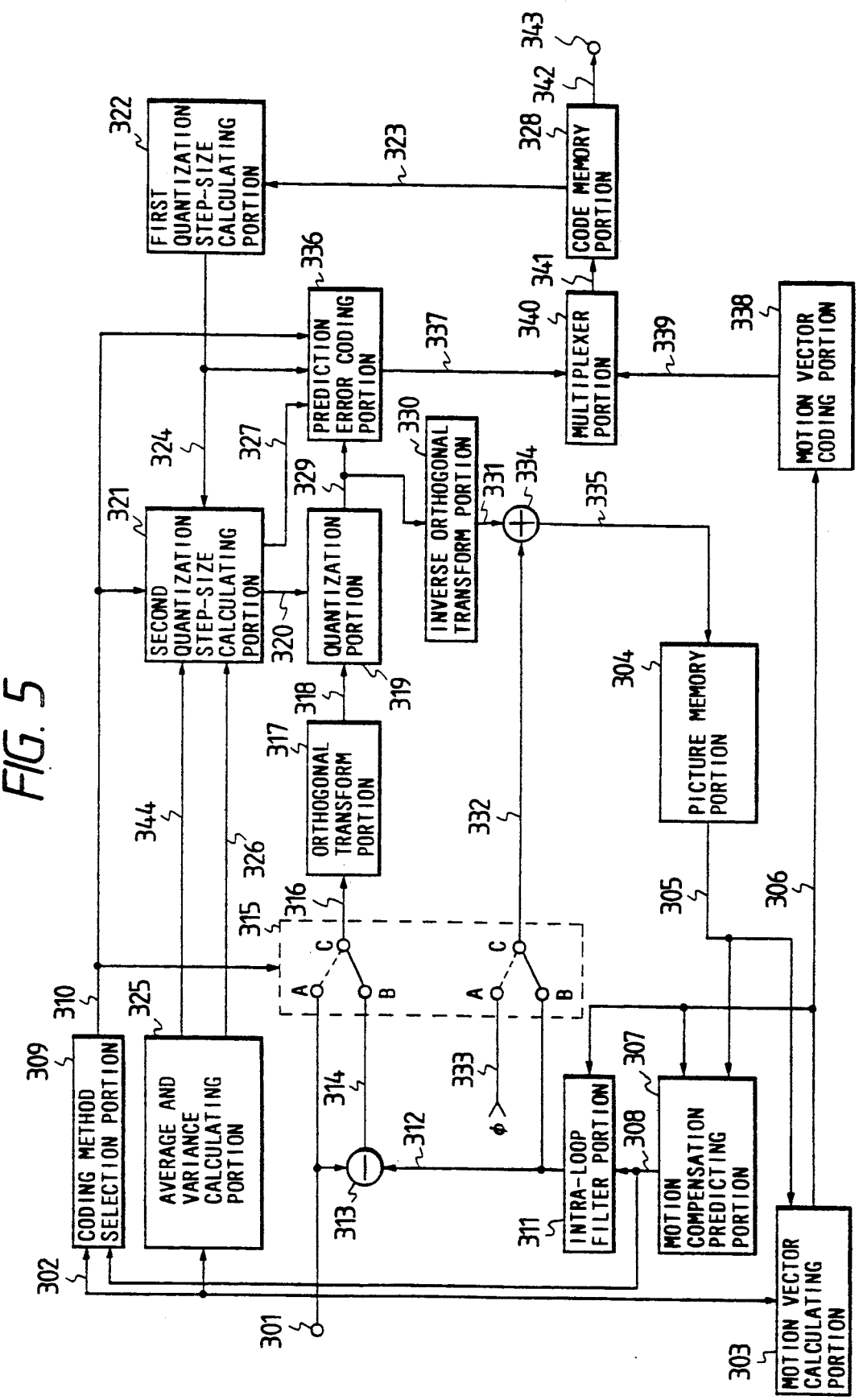
FIG. 5 is a schematic block diagram for showing a third motion compensated prediction interframe coding system embodying the present invention.

Next, a third embodiment of the present invention will be described hereinbelow with reference to FIG. 5.

In this figure, reference numeral 301 designates an input terminal from which television signals are inputted to the system; 303 a motion vector calculating portion for comparing a picture signal of a coding block of a current frame with a reproduced picture signal of a previous frame and calculating a motion vector; 304 a picture memory portion for storing reproduced picture signals of a current and previous frames; 307 a motion compensation predicting portion for performing a motion compensation predicting of the reproduced picture signals of the previous frame; 309 a coding method selection portion for selecting a method of coding of a block from an interframe coding and intraframe coding methods; 311 an intra-loop filter portion for performing two-dimensional lowpass filtering processing of a motion compensation predicting signal; 313 a prediction error evaluating portion for evaluating a prediction error by computing the difference between an original picture signal and a predictive signal of a coding block; 315 a switch portion for selecting a signal, of which an orthogonal transform is effected, in accordance with a coding method selecting signal and further selecting a signal from which a reproduced picture is calculated; 317 an orthogonal transform portion for performing an orthogonal transform of the prediction error signal; 319 a quantization portion for quantizing coefficients of an orthogonal transform; 321 a second quantization step-size computing portion for computing a second step size for the quantization; 322 a first quantization step-size computing portion for computing a first step size for the quantization; 325 an average and variance calculating portion for calculating the averaged value of the level of and a variance of the input television signal; 328 a code memory portion for temporarily storing a transmission frame; 330 an inverse orthogonal transform portion for effecting an inverse orthogonal transform of the quantized orthogonal transform coefficients; 334 a reproduced picture calculating portion for calculating a reproduced picture of a current frame; 336 a prediction error coding portion for performing what is called "transmitting channel coding" of a coding method selection signal, a prediction error, the first quantization step size and quantization class information; 338 a motion vector coding portion for performing the transmitting channel coding of a motion vector; 340 a multiplexer portion for computing a transmitting frame on the basis of the prediction code and the motion vector code; and 343 an output terminal from which a transmission signal is output.

Hereinafter, an operation of this motion compensated prediction interframe coding system having the above described arrangement will be described.

First, television signals are converted into digital television signals by an A/D conversion circuit (not shown). Then, pixels represented by the digital television signals are divided into blocks each of which is a rectangular array composed of M × N pixels arranged in M columns and N rows. Further, the digital television signals are input to the system from the input terminal 301 as input television signals 302. Then, the motion vector calculating portion 303 compares the input television signal 302 with a reproduced picture signal 305 of a previous frame read from the picture memory portion 304 and calculating the motion of a coding block as a motion vector and moreover outputs a motion vector signal 306 representing the motion vector. Simultaneously, the motion vector calculating portion 303 judges from the result of the evaluation of the motion vector whether the motion compensation prediction made with respect to the coding block is effective or ineffective. Further, the motion vector calculating portion 303 outputs motion compensation prediction control information signal which represents the result of the judgement and is superposed on the motion vector signal 306.

A motion compensation predicting portion 307 performs a motion compensation prediction of the reproduced television signal 305 of a previous frame in case where the motion compensation prediction control information indicates that the motion compensation prediction prediction is effective (i.e., the motion compensation prediction is be effected by using motion vector) and outputs the reproduced television signal 20 without change as a motion compensation prediction signal 308 in case where the motion compensation prediction control information indicates that the motion compensation prediction is ineffective (i.e., the motion compensation prediction should not be effected).

The coding method selection portion 309 compares the input television signal 302 with the motion compensation prediction signal 308 every block and judges whether or not the motion compensation prediction is effective. Further, the coding method selection portion 309 judges that an intraframe coding method is effective for a current block in question in case where the motion compensation prediction is effective and that an interframe coding method is effective for a current block in question in case where the motion compensation prediction is not effective, and outputs a coding method selection signal 310 representing the result of this judgement. Further, in case of a coding system in which it is necessary to insert a refreshment frame between other frames, the portion 209 selects the coding method selection signal 310 in such a manner to code all of the blocks by use of the intra-frame coding method by inserting a refreshment frame between other frames every constant frame period.

Then, the intra-loop filtering portion 311 performs the two-dimensional lowpass filtering processing of the motion compensation prediction signal 308 in case where the motion compensation of a coding block is to be effected by using the motion vector and in another case, outputs the motion compensation prediction signal 308 as a prediction signal 312 without effecting the intra-loop filtering processing.

Subsequently, the prediction error evaluating portion 313 evaluates the difference between the input television signal 302 and the prediction signal 312 of the coding block and outputs a prediction error signal 314 representing the evaluated difference.

Thereafter, in case where the coding method selection signal 310 indicates that the intraframe coding method is selected, the switching portion 315 selects the input television 302 as a signal 316 to be transformed by performing the orthogonal transform. In contrast, in case where the coding method selection signal 310 indicates that the interframe coding method is selected, the switching portion 315 selects the prediction error signal 314 as a signal 316.

Further, the orthogonal transform portion 317 performs the orthogonal transform of the signal 316 to remove therefrom effects of the high-degree correlation between each pair of the neighbors of a pixel corresponding to the signal 316 and further outputs an orthogonal transform coefficient signal 318 representing orthogonal transform coefficients. At that time, the DCT, which has a high efficiency of transform and of which firmware may be realized, is usually employed as the orthogonal transform.

Then, the quantization portion 319 quantizes the orthogonal transform coefficients represented by the signal 318 by using the second quantization step size. Hereinafter, a method of calculating the second quantization step size represented by a second quantization step size signal 320.

(1) In case where a coding block is a block to be coded by the intraframe coding method:

The second quantization step size calculating portion 321 outputs the first quantization step size calculated by the first quantization step size calculating portion 322 from the amount of the remained code 323 by using the method described with reference to FIG. 1 as the second quantization step size.

(2) In case where a coding block is a block to be coded by the interframe coding method:

By effecting a process of steps (I) and (II) as will be described later, a variance of gray levels of pixels of the coding block is first calculated. Then, the block is divided into classes according to the calculated variance. Moreover, the second quantization step size actually used in the quantization for each class is calculated from the first quantization step size.

(I) The variance calculating portion 325 calculates an averaged value $\mu$ of the level of and a variance $\sigma^2$ of the input television signal 302 of the coding block from the following equations (9) and (10) and outputs an averaged value signal 344 and a variance signal 326 representing the calculated variance. Incidentally, the averaged value $\mu$ is used to judge whether or not the first quantization step size should be changed according to the fineness of the pattern of a block.

Further, the variance $\sigma^2$ is small in case where the fineness of a block represented by the input television signal 302 is high, while the variance $\sigma^2$ is large in case where the fineness of a block represented by the input television signal 302 is low.

$$\mu = (1/(M \times N)) \sum_{i=1}^{M} \sum_{j=1}^{N} (p(i,j)) \quad (9)$$

$$\sigma^2 = (1/(M \times N)) \sum_{i=1}^{M} \sum_{j=1}^{N} (p(i,j) - \mu)^2 \quad (10)$$

where M represents the number of columns (or pixels on a row) of a block; N the number of rows of the block; and p(i,j) a gray level of a pixel at an address (i,j) in the block.

(II) Further, the second quantization step size calculating portion 321 calculates a second quantization step size represented by a second quantization step size signal 320 and the quantization class information represented by a quantization class information signal 327 from the coding block variance signal 326, the averaged value signal 344 (hereunder sometimes referred to as the coding block averaged value signal) corresponding to the coding block and the first quantization step size signal 324. Further, the first quantization step size represented by the signal 324 is obtained by the first quantization step size calculating portion 322 from the amount 323 of the codes remained in the code memory 328 by using the method employed in the prior art system.

The second quantization step size calculating portion 321 compares the averaged value represented by the signal 344 and the variance represented by the signal 326 with each of four threshold values th1, th2, th3 and th4 with respect to a block to be coded by using the interframe coding method and divides each block into four quantization classes. Further, the second quantization step size represented by the second quantization step size signal 320 for each block obtained from the first quantization step size represented by the first quantization step size signal 324. Incidentally, let Qb denote the first quantization step size; and Qstep the second quantization step size.

①  In case where $0 \leq \sigma^2 < th1$ and $\mu > th4$, the class No. (Qstep Class)=1 and Qstep=(¼)Qb;
②  In case where $th1 \leq \sigma^2 < th2$ and $\mu > th4$, Qstep Class=2 and Qstep=(2/4)Qb;
③  In case where $th2 \leq \sigma^2 < th3$ and $\mu > th4$, Qstep Class=3 and Qstep=(¾)Qb; and
④  In case where $th3 \leq \sigma^2$ and $\mu > th4$, Qstep Class=4 and Qstep=Qb.

Thereby, the second quantization step size 320 used for quantizing a block to be coded by using the interframe coding method is made to become smaller than the first quantization step size 324 in case where the averaged value of the level of the input television signal 302 is equal to or more than a predetermined constant value and the fineness of the picture pattern of the block is high.

Then, the quantization portion 319 quantizes the orthogonal transform coefficients 314 by using the second quantization step size 320 to obtain orthogonal transform quantization coefficients and outputs an orthogonal transform quantization coefficient signal 329 representing the orthogonal transform quantization coefficients. Further, the inverse orthogonal transform portion 330 performs the inverse orthogonal transform of the orthogonal transform quantization coefficients 329 and outputs a quantization-error-containing error signal 331 representing the result of the inverse orthogonal transform.

Further, the switching portion 316 selects a numerical-value-zero signal 333 as a reproduced picture calculating signal 332 in case where the coding method selection signal 310 selects the intraframe coding method. In contrast, the switching portion 316 selects the prediction signal 312 as the reproduced picture calculating signal 332 in case where the coding method selection signal 310 selects the interframe coding method.

Then, the reproduced picture calculating portion 334 adds the reproduced picture calculating signal 332 and the quantization-error-containing orthogonal transform signal 331 and outputs a reproduced picture signal 335 representing a reproduced picture of the coding block. Further, the picture memory 304 stores the reproduced picture signal 335 of the current frame and outputs the reproduced picture signal 305 of the previous frame.

Moreover, the prediction error coding portion 336 performs the coding of the orthogonal transform quantization coefficients represented by the signal 325, a the first quantization step size represented by the signal 324, the quantization class information represented by the signal 327 and the information represented by the coding method selection signal 310 and outputs a prediction error code 337.

Furthermore, the motion vector coding portion 338 performs the coding of the motion vector signal 306 and calculates a motion vector code, which is represented by a motion vector code signal 339.

Thereafter, the multiplexer portion 340 calculates a transmission frame 341, which has a predetermined format, from the prediction error code 337 and the motion vector code 339.

Subsequently, the code memory portion 328 stores the transmission frame 341 once and further outputs the transmission frame 341 from the output terminal 343 in synchronization with a clock signal, which is inputted from an external circuit (not shown), as a transmission code represented by a transmission code signal 342. Simultaneously, the code memory portion 328 calculates an amount of codes remained therein and outputs a signal 323 indicating the calculated amount of the remained codes.

As is apparent from the foregoing description, this embodiments calculates the second quantization step size from the first quantization step size as proportional to the fineness of the pattern of each block, which is coded by effecting the intra-frame coding method, among a group of continuous blocks, each of which is quantized by using a quantization step size, in case where the averaged value of the gray levels of pixels of an input picture is equal to or more than a predetermined constant value, and further quantizes the prediction error of a block having a fine pattern by using the second quantization step size. Thereby, the picture quality of the entire reproduced picture can be improved without degrading the fineness of the pattern or texture of the picture.

Incidentally, the variance 326 calculated by the portion 325 is defined by the equation (9). However, any other kind of measure may be employed as the variance so long as it can be used to measure the fineness of a picture represented by the input television signal 302. For example, the following measure D defined by an equation (11) may be employed because the size of a block is generally fixed (namely, the number of pixels on a row is M and that of rows is N) and the calculation thereof can be easily effected.

$$D = (1/(M \times N)) \sum_{i=1}^{M} \sum_{j=1}^{N} |p(i,j) - P| \quad (11)$$

where p(i,j) denotes a gray level of a pixel at an address (i,j) in the block; and P the averaged value of the gray levels of the pixels of the block.

Further, in this embodiment, it is determined depending on the averaged value of the gray levels of the pixels of the input picture whether or not the first quantization step size should be changed. However, such determination may be made depending on another measure which can appropriately represent characteristics of the gray levels of the pixels of the entire input picture store.

Furthermore, in this embodiment, the number of the classes is four, as above described, However, a different number may be employed as the number of the classes so long as the second quantization step size can be determined to be small for a block having a small variance. As described above, this embodiment first measures characteristics regarding the fineness of a picture pattern or texture of each block of picture, which is represented by an input television signal and is divided into a group of continuous blocks each quantized by using a quantization step size, and changes the quantization step size into a smaller one when quantizing a block having a fine pattern or texture and to be coded by effecting the intra-frame coding method, in case where the averaged value of the gray levels of the pixels of the entire input picture. Thereby, an amount of generated codes can be limited but the coding of a moving picture can be performed without degrading the fineness of the texture of the input or original picture. Further, the picture quality of the reproduced picture can be improved. Therefore, practically, the present invention is very advantageous. Especially, the picture quality of the refreshment frame can be substantially improved.

Figure 6:
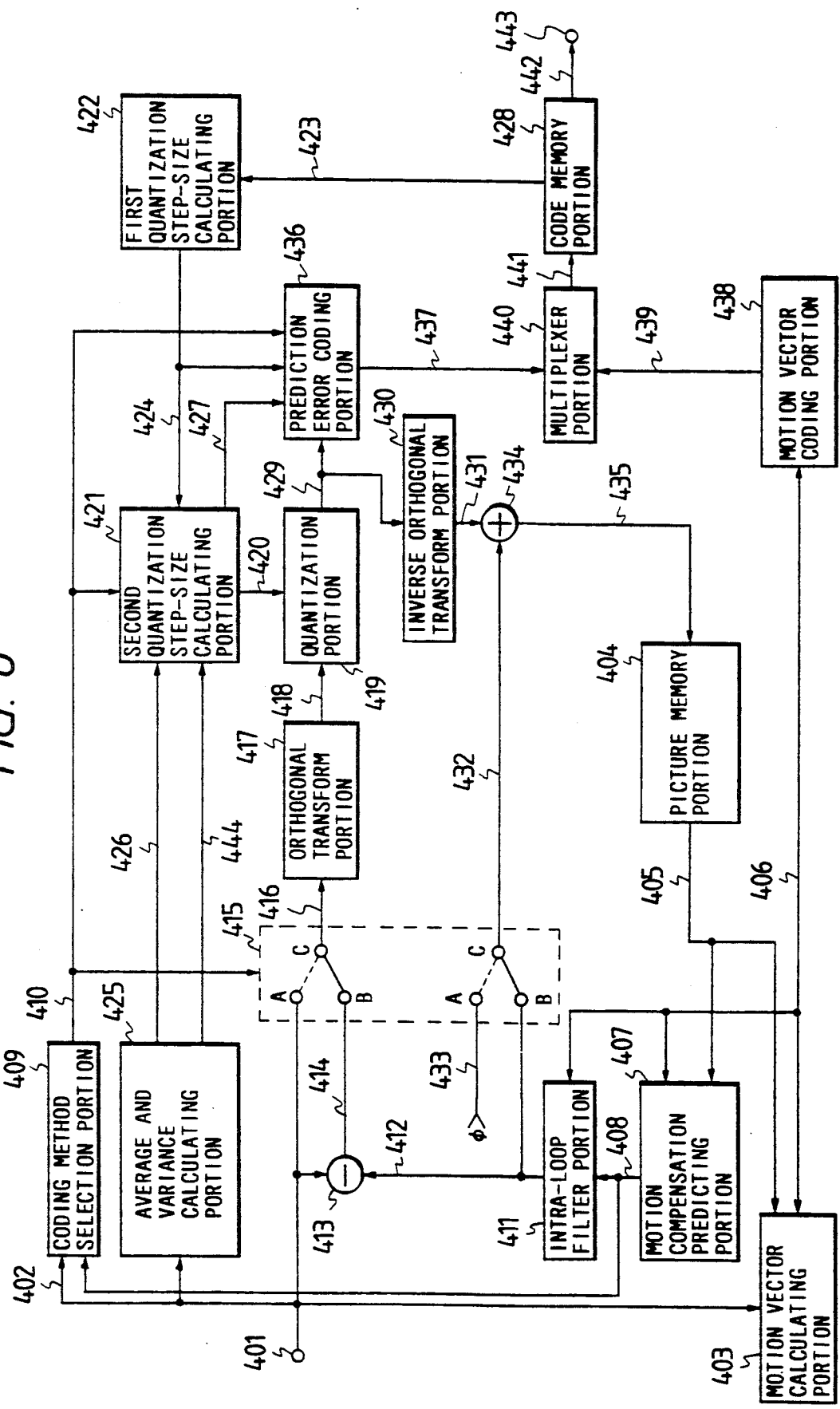
FIG. 6 is a schematic block diagram for showing a fourth motion compensated prediction interframe coding system embodying the present invention.

Next, a fourth embodiment of the present invention will be described hereinbelow with reference to FIG. 6.

In this figure, reference numeral 401 designates an input terminal from which television signals are inputted to the system; 403 a motion vector calculating portion for comparing a picture signal of a coding block of a current frame with a reproduced picture signal of a previous frame and calculating a motion vector; 404 a picture memory portion for storing reproduced picture signals of a current and previous frames; 407 a motion compensation predicting portion for performing a motion compensation predicting of the reproduced picture signals of the previous frame; 409 a coding method selection portion for selecting a method of coding of a block from an interframe coding and intraframe coding methods; 411 an intra-loop filter portion for performing two-dimensional lowpass filtering processing of a motion compensation predicting signal; 413 a prediction error evaluating portion for evaluating a prediction error by computing the difference between an original picture signal and a predictive signal of a coding block; 415 a switch portion for selecting a signal, of which an orthogonal transform is effected, in accordance with a coding method selecting signal and further selecting a signal from which a reproduced picture is calculated; 417 an orthogonal transform portion for performing an orthogonal transform of the prediction error signal; 419 a quantization portion for quantizing coefficients of an orthogonal transform; 421 a second quantization step-size computing portion for computing a second step size for the quantization; 422 a first quantization step-size computing portion for computing a first step size for the quantization; 425 an average and variance calculating portion for calculating the averaged value of the level of and a variance of the input television signal; 428 a code memory portion for temporarily storing a transmission frame; 430 an inverse orthogonal transform portion for effecting an inverse orthogonal transform of the quantized orthogonal transform coefficients; 434 a reproduced picture calculating portion for calculating a reproduced picture of a current frame; 436 a prediction error coding portion for performing the "transmitting channel coding" of a coding method selection signal, a prediction error, the first quantization step size and quantization class information; 438 a motion vector coding portion for performing the transmitting channel coding of a motion vector; 440 a multiplexer portion for computing a transmitting frame on the basis of the prediction code and the motion vector code; and 443 an output terminal from which a transmission signal is output.

Hereinafter, an operation of this motion compensated prediction interframe coding system, having the above described arrangement will be described.

First, television signals are converted into digital television signals by an A/D conversion circuit (not shown). Then, pixels represented by the digital television signals are divided into blocks each of which is a rectangular array composed of $M \times N$ pixels arranged in M columns and N rows. Further, the digital television signals are input to the system from the input terminal 301 as input television signals 402.

Then, the motion vector calculating portion 403 compares the input television signal 402 with a reproduced picture signal 405 of a previous frame read from the picture memory portion 404 and calculating the motion of a coding block as a motion vector and moreover outputs a motion vector signal 406 representing the motion vector. Simultaneously, the motion vector calculating portion 403 judges from the result of the evaluation of the motion vector whether the motion compensation prediction made with respect to the coding block is effective or ineffective. Further, the motion vector calculating portion 403 outputs motion compensation prediction control information signal which represents the result of the judgement and is superposed on the motion vector signal 406.

A motion compensation predicting portion 407 performs a motion compensation prediction of the reproduced television signal 405 of a previous frame in case where the motion compensation prediction control information indicates that the motion compensation prediction prediction is effective (i.e., the motion compensation prediction is be effected by using motion vector 406) and outputs the reproduced television signal without change as a motion compensation prediction signal 408 in case where the motion compensation control information indicates that the motion compensation prediction is ineffective (i.e., the motion compensation prediction should not be effected).

The coding method selection portion 409 compares the input television signal 402 with the motion compensation signal 408 every block and judges whether or not the motion compensation prediction is effective. Further, the coding method selection portion 409 judges that an intraframe coding method is effective for a current block in question in case where the motion compensation prediction is effective and that an interframe coding method is effective for a current block in question in case where the motion compensation prediction is not effective, and outputs a coding method selection signal 410 representing the result of this judgement. Further, in case of a coding system in which it is necessary to insert a refreshment frame between other frames, the portion 409 selects the coding method selection signal 410 in such a manner to code all of the blocks by use of the intra-frame coding method by inserting a refreshment frame between other frames every constant frame period.

Then, the intra-loop filtering portion 411 performs the two-dimensional lowpass filtering processing of the motion compensation prediction signal 408 in case where the motion compensation of a coding block is to be effected by using the motion vector and in another case, outputs the motion compensation prediction signal 408 as a prediction signal 412 without effecting the intra-loop filtering processing.

Subsequently, the prediction error evaluating portion 413 evaluates the difference between the input television signal 402 and the prediction signal 412 of the coding block and outputs a prediction error signal 414 representing the evaluated difference.

Thereafter, in case where the coding method selection signal 410 indicates that the intraframe coding method is selected, the switching portion 415 selects the input television 402 as a signal 416 to be transformed by performing the orthogonal transform. In contrast, in case where the coding method selection signal 410 indicates that the interframe coding method is selected, the switching portion 415 selects the prediction error signal 414 as a signal 416.

Further, the orthogonal transform portion 417 performs the orthogonal transform of the signal 416 to remove therefrom effects of the high-degree correlation between each pair of the neighbors of a pixel corresponding to the signal 416 and further outputs an orthogonal transform coefficient signal 418 representing orthogonal transforms coefficients. At that time, the DCT, which has a high efficiency of transform and of which firmware may be realized, is usually employed as the orthogonal transform.

Then, the quantization portion 419 quantizes the orthogonal transform coefficients represented by the signal 418 by using the second quantization step size. Hereinafter, a method of calculating the second quantization step size represented by a second quantization step size signal 420.

(1) In case where a coding block is a block to be coded by the intraframe coding method or is not a block represented by a luminance signal (hereunder referred to as a luminance signal block):

The second quantization step size calculating portion 421 outputs the first quantization step size calculated by the first quantization step size calculating portion 422 from the amount of the remained code 423 by using the method described with reference to FIG. 1 as the second quantization step size.

(2) In case where a coding block is a block to be coded by the interframe coding method and is a luminance signal block:

By effecting a process of steps (1) and (2) as will be described later, a variance of gray levels of pixels of the coding block is first calculated. Then, the block is divided into classes according to the calculated variance. Moreover, the second quantization step size actually used in the quantization for each class is calculated from the first quantization step size.

(1) The variance calculating portion 425 calculates an averaged value $\mu$ of the level of and a variance $\sigma^2$ of the input television signal 402 of the coding block from the following equations (12) and (13) and outputs an averaged value signal 444 and a variance signal 426 representing the calculated variance. Incidentally, the averaged value $\mu$ is used to judge whether or not the first quantization step size should be changed according to the fineness of the pattern of a block.

Further, the variance $\sigma^2$ is small in case where the fineness of a block represented by the input television signal 402 is high, while the variance $\sigma^2$ is large in case where the fineness of a block represented by the input television signal 402 is low.

$$\mu = (1/(M \times N)) \sum_{i=1}^{M} \sum_{j=1}^{N} p(i,j) \quad (12)$$

$$\sigma^2 = (1/(M \times N)) \sum_{i=1}^{M} \sum_{j=1}^{N} (p(i,j) - \mu)^2 \quad (13)$$

where M represents the number of columns (or pixels on a row) of a block; N the number of rows of the block; and p(i,j) a gray level of a pixel at an address (i,j) in the block.

(2) Further, the second quantization step size calculating portion 421 calculates a second quantization step size represented by a second quantization step size signal 420 and the quantization class information represented by a quantization class information signal 427 from the coding block variance signal 426, the coding block averaged value signal 444 and the first quantization step size signal 424. Further, the first quantization step size represented by the signal 424 is obtained by the first quantization step size calculating portion 422 from the amount 423 of the codes remained in the code memory 428 by using the method employed in the prior art system. The second quantization step size calculating portion 421 first modifies the predetermined threshold values th1-th4 according to the first quantization step size. A method of modifying the threshold values will be described hereinbelow.

That is, the portion 421 first compares the first quantization step size Qb with a predetermined threshold value thq.

(1) In case where $Qb \leq thq$,

The threshold values th1, th2, th3 and th4 are intact, namely, are not modified.

(2) In case where $Qb > thq$,

The threshold values th1, th2, th3 and th4 used for the classification are modified by the following equation (14):

$$thi = -\{thi/(max - thq)\}(Qb - thq) + thi \quad (14)$$

where a subscript i indicates an integer from 1 to 4; and "max" represents a maximum value of the quantization step size Qb.

Figure 7:
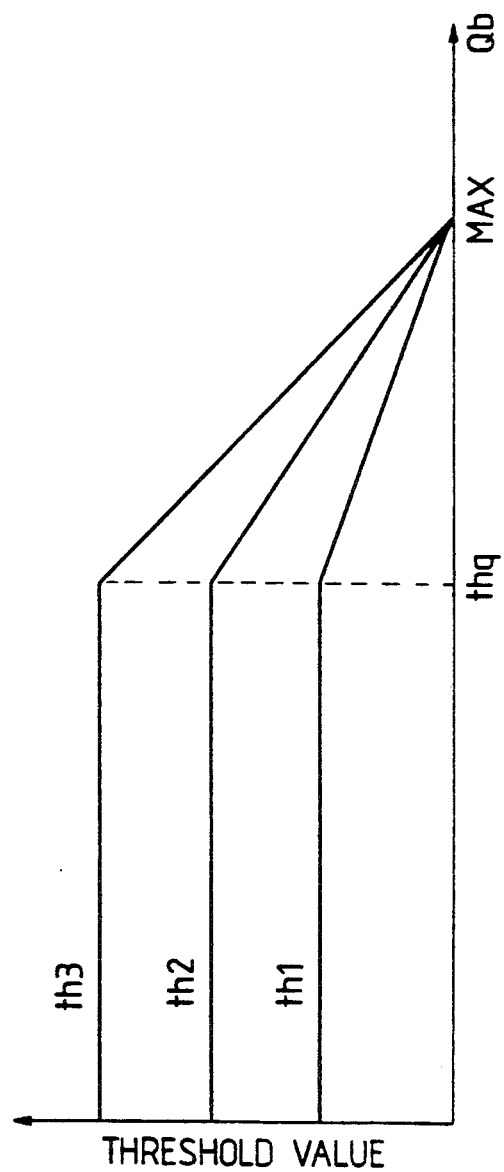
FIG. 7 is a diagram for illustrating the relation between the quantization step sizes and threshold values.

FIG. 7 shows the relation between the quantization step size Qb and the threshold value thi (i=1, 2, 3 and 4).

Next, the portion 421 compares the averaged value represented by the signal 444 and the variance represented by the signal 426 with each of the threshold values th1, th2, th3 and th4 with respect to a block, which is a luminance signal block and is to be coded by using the interframe coding method and divides each of such blocks into four quantization classes. Further, the second quantization step size represented by the second quantization step size signal 420 for each block obtained from the first quantization step size represented by the first quantization step size signal 424. Incidentally, let Qb denote the first quantization step size; and Qstep the second quantization step size.

① In case where $0 \leq \sigma^2 < th1$ and $\mu > th4$, the class No. (Qstep Class)=1 and Qstep=(1/4)Qb;

② In case where $th1 \leq \sigma^2 < th2$ and $\mu > th4$, Qstep Class=2 and Qstep=(2/4)Qb;

③ In case where $th2 \leq \sigma^2 < th3$ and $\mu > th4$, Qstep Class=3 and Qstep=(3/4)Qb; and ④ In case where $th3 \leq \sigma^2$ and $\mu > th4$, Qstep Class=4 and Qstep=Qb.

Thereby, the second quantization step size 420 used for quantizing a block to be coded by using the interframe coding method is made to become smaller than the first quantization step size 424 in case where the averaged value of the level of the input television signal 402 is equal to or more than a predetermined constant value and the fineness of the picture pattern of the block is high. Further, when the first quantization step size is more than a predetermined constant value, the system modifies the threshold values thi (i=1, 2, 3 and 4), so that the number of blocks to be quantized by using a quantization step size smaller than the first quantization step size can be decreased and the amount of the code corresponding to the luminance signal can be reduced and the discoloration of the coding block, which is due to the fact that the amount of the code corresponding to the color difference signal is extremely small, can be prevented.

Further, the quantization portion 419 quantizes the orthogonal transform coefficients 414 by using the second quantization step size 420 to obtain orthogonal transform quantization coefficients and outputs an orthogonal transform quantization coefficient signal 429 representing the orthogonal transform quantization coefficients. Further, the inverse orthogonal transform portion 430 performs the inverse orthogonal transform of the orthogonal transform quantization coefficients 429 and outputs a quantization-error-containing signal 431 representing the result of the inverse orthogonal transform.

Further, the switching portion 416 selects a numerical-value-zero signal 433 as a reproduced picture calculating signal 432 in case where the coding method selection signal 410 selects the intraframe coding method. In contrast, the switching portion 416 selects the prediction signal 412 as the reproduced picture calculating signal 432 in case where the coding method selection signal 410 selects the interframe coding method.

Then, the reproduced picture calculating portion 434 adds the reproduced picture calculating signal 432 and the quantization-error-containing signal 431 and outputs a reproduced picture signal 435 representing a reproduced picture of the coding block. Further, the picture memory 404 stores the reproduced picture signal 435 of the current frame and outputs the reproduced picture signal 405 of the previous frame.

Moreover, the prediction error coding portion 436 performs the coding of the orthogonal transform quantization coefficients represented by the signal 425, a the first quantization step size represented by the signal 424, the quantization class information represented by the signal 427 and the information represented by the coding method selection signal 410 and outputs a prediction error code 437.

Furthermore, the motion vector coding portion 438 performs the coding of the motion vector signal 406 and calculates a motion vector code, which is represented by a motion vector code signal 439 representing the motion vector code.

Thereafter, the multiplexer portion 440 calculates a transmission frame 441, which has a predetermined format, from the prediction error code 437 and the motion vector code 439.

Subsequently, the code memory portion 428 stores the transmission frame 441 once and further outputs the transmission frame 441 from the output terminal 443 in synchronization with a clock signal, which is inputted from an external circuit (not shown), as a transmission code represented by a transmission code signal 442. Simultaneously, the code memory portion 428 calculates an amount of codes remained therein and outputs a signal 423 indicating the calculated amount of the remained codes.

As is apparent from the foregoing description, this embodiments calculates the second quantization step size from the first quantization step size as proportional to the fineness of the pattern of each block, which is coded by effecting the intra-frame coding method, among a group of continuous blocks, each of which is quantized by using a quantization step size, in case where the averaged value of the gray levels of pixels of an input picture is a predetermined constant value, and further quantizes the orthogonal transform coefficients by using the the second quantization step size. Thereby, the picture quality of the entire reproduced picture can be improved without degrading the fineness of the pattern or texture of the picture.

Further, as above described, when the first quantization step size is more than a predetermined constant value, the system modifies the threshold values thi (i=1, 2, 3 and 4) for the classification, so that the number of blocks to be quantized by using a quantization step size smaller than the first quantization step size can be decreased and the amount of the code corresponding to the luminance signal can be reduced and the discoloration of the coding block, which is due to the fact that the amount of the code corresponding to the color difference signal is extremely small, can be prevented.

Incidentally, the variance 426 calculated by the portion 425 is defined by the equation (12). However, any other kind of measure may be employed as the variance so long as it can be used to measure the fineness of a picture represented by the input television signal 402. For example, the following measure D defined by an equation (15) may be employed because the size of a block is generally fixed (namely, the number of pixels on a row is M and that of rows is N) and the calculation thereof can be easily effected.

$$D = (1/(M \times N)) \sum_{i=1}^{M} \sum_{j=1}^{N} |p(i,j) - \mu| \quad (15)$$

where p(i,j) denotes a gray level of a pixel at an address (i,j) in the block; and $\mu$ the averaged value of the gray levels of the pixels of the block.

Further, in this embodiment, it is determined depending on the averaged value of the gray levels of the pixels of the input picture whether or not the first quantization step size should be changed. However, such determination may be made depending on another measure which can appropriately represent characteristics of the gray levels of the pixels of the entire input picture.

Furthermore, in this embodiment, the number of the classes is also four, as above described. However, a classes is also four, as above described. However, a different number may be employed as the number of the classes so long as the second quantization step size can be determined to be small for a block having a small variance.

Additionally, in this embodiment, the threshold values thi (i=1, 2, 3 and 4) for the classification are modified by the equation (14). Apparently, another method of modifying the threshold values for the classification may be employed so long as the threshold values for the classification modified by the method becomes smaller when the quantization step sizes become larger.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A motion compensated prediction interframe coding system comprising:
   an analog-to-digital conversion means for performing an analog-to-digital conversion of a television signal;
   a block dividing means for dividing a predetermined area of the television signal digitalized by said analog-to-digital conversion means into blocks each having a predetermined size;
   a motion vector calculating means for calculating a motion vector, which represents a motion of a television picture represented by the television signal, of each block and for judging with respect to each block whether or not the motion compensation is performed by using by the motion vector;
   a motion compensation means for performing a motion compensation of a reproduced picture signal of a previous frame with respect to each block of which the motion compensation is determined by said motion vector calculating means to be effected and for calculating predicted gray levels of pixels of each block of which the motion compensation is effected;
   a prediction error evaluating means for computing the difference between the gray level of each pixel of a coding block of the television picture and the predicted gray level thereof as a prediction error thereof;
   an orthogonal transform means for performing an orthogonal transform of the prediction error of each pixel of a coding block of the television picture so as to obtain orthogonal transform coefficients;
   a first quantization step-size computing means for computing a first step size for the quantization from an amount of generated codes;
   a variance calculating means for calculating a variance of the gray levels of the pixels of each block of input television signal;
   a second quantization step-size computing means for classifies the blocks into a predetermined number of classes according to the variance and computing a second step size for the quantization of each block from the first step size;
   a quantization means for quantizing coefficients of an orthogonal transform by using the second step size to obtain quantized coefficients of orthogonal transform;
   an orthogonal transform coefficient coding means for performing the coding of the prediction error, the first step size and information on the classes and the quantized coefficients of the orthogonal transform;
   a quantized prediction error calculating means for effecting an inverse orthogonal transform of the quantized coefficients of the orthogonal transform to obtain quantized prediction errors;
   a reproduced picture calculating means for calculating a reproduced picture from the quantized prediction errors and the predicted gray levels of the pixels of the blocks;
   a memory portion for storing the reproduced picture; and
   a motion vector coding means for performing the coding of the motion vectors.

2. A motion compensated prediction interframe coding system as set forth in claim 1 wherein the predetermined area is one frame.

3. A motion compensated prediction interframe coding system as set forth in claim 1 wherein the predetermined area is one field.

4. A motion compensated prediction interframe coding system comprising:
   an analog-to-digital conversion means for performing an analog-to-digital conversion of a television signal;
   a block dividing means for dividing a predetermined area of the television signal digitalized by said analog-to-digital conversion means into blocks each having a predetermined size;
   a motion vector calculating means for calculating a motion vector, which represents a motion of a television picture represented by the television signal, of each block and for judging with respect to each block whether or not the motion compensation is performed by using by the motion vector;
   a motion compensation means for performing a motion compensation of a reproduced picture signal of a previous frame with respect to each block of which the motion compensation is determined by said motion vector calculating means to be effected and for calculating predicted gray levels of pixels of each block of which the motion compensation is effected;
   a prediction error evaluating means for computing the difference between the gray level of each pixel of a coding block of the television picture and the predicted gray level thereof as a prediction error thereof;
   a coding method selection means for selecting a method of coding of a block from an interframe coding and intraframe coding methods;
   a first switch means for selecting a signal, of which an orthogonal transform is effected, in accordance with the selection made by said coding method selecting means from the gray levels of pixels of blocks represented by the television signal and the prediction errors;
   an orthogonal transform means for performing an orthogonal transform of the prediction error or the gray levels selected by said first switch means;
   a first quantization step-size computing means for computing a first step size for the quantization from an amount of generated codes;
   a variance calculating means for calculating a variance of the gray levels of the pixels of each block of input television signal;
   a second quantization step-size computing means for classifying the blocks into a predetermined number of classes according to the variance and computing a second step size for the quantization of each block from the first step size in case of the blocks to be coded by using an intra-frame coding method and for treating the first step sizes as the second step sizes in case of the blocks to be coded by using an interframe coding method;
   a quantized transform coefficient calculating means for quantizing coefficients of an orthogonal transforms by using the second step size to obtain quantized coefficients of an orthogonal transform;
   an orthogonal transform coefficient coding means for performing information on the selection of the coding methods, the coding of the prediction error, the first step size and information on the classes and the quantized coefficients of the orthogonal transform;

an inverse quantization means for effecting an inverse orthogonal transform of the quantized coefficients of the orthogonal transform to obtain inversely-quantized values;

a second switch means for selecting a numerical value of zero as a gray level of a pixels of a reproduced picture in case where said coding method selection means selects the intraframe coding method and in contrast, selects the predicted value as the gray level of a pixel of the reproduced picture in case where the coding method selection means selects the interframe coding method;

a reproduced picture calculating means for calculating a reproduced picture from the inversely-quantized values and the numerical value of zero or from the predicted gray levels of the pixels of the blocks;

a memory portion for storing the reproduced picture; and a motion vector coding means for performing the coding of the motion vectors.

5. A motion compensated prediction interframe coding system as set forth in claim 4 wherein the predetermined area, is one frame.

6. A motion compensated prediction interframe coding system as set forth in claim 4 wherein the predetermined area is one field.

7. A motion compensated prediction interframe coding system comprising:

an analog-to-digital conversion means for performing an analog-to-digital conversion of a television signal;

a block dividing means for dividing a predetermined area of the television signal digitalized by said analog-to-digital conversion means into blocks each having a predetermined size;

a motion vector calculating means for calculating a motion vector, which represents a motion of a television picture represented by the television signal, of each block and for judging with respect to each block whether or not a motion compensation prediction is performed by using by the motion vector;

a motion compensation predicting means for performing a motion compensation prediction of a reproduced picture signal of a previous frame with respect to each block of which the motion compensation prediction is determined by said motion vector calculating means to be effected and for calculating predicted gray levels of pixels of each block of which the motion compensation prediction is effected;

a prediction error evaluating means for computing the difference between the gray level of each pixel of a coding block of the television picture and the predicted gray level thereof as a prediction error thereof;

a coding method selection means for selecting a method of coding of a block from an interframe coding and intraframe coding methods;

a first switch means for selecting a signal, of which an orthogonal transform is effected, in accordance with the selection made by said coding method selecting means from the gray levels of pixels of blocks represented by the television signal and the prediction errors;

an orthogonal transform means for performing an orthogonal transform of the prediction error or the gray levels selected by said first switch means;

a first quantization step-size computing means for computing a first step size for the quantization from an amount of generated codes;

an average and variance calculating means for calculating an averaged value and a variance of the gray levels of the pixels of each block of input television signal;

a second quantization step-size computing means for classifying the blocks into a predetermined number of classes according to the averaged value and variance and computing a second step size for the quantization of each block from the first step size in case of the blocks to be coded by using an intraframe coding method and for treating the first step sizes as the second step sizes in case of the blocks to be coded by using an interframe coding method;

a quantized transform coefficient calculating means for quantizing coefficients of an orthogonal transform by using the second step size to obtain quantized coefficients of an orthogonal transform;

an orthogonal transform coefficient coding means for performing information on the selection of the coding methods, the coding of the prediction error, the first step size and information on the classes and the quantized coefficients of the orthogonal transform;

an inverse quantization means for effecting an inverse orthogonal transform of the quantized coefficients of the orthogonal transform to obtain inversely-quantized values;

a second switch means for selecting a numerical value of zero or the predicted gray level obtained by the motion compensation prediction as a gray level of a pixels of a reproduced picture according to the selection made by said coding method selection means;

a reproduced picture calculating means for calculating a reproduced picture from the inversely-quantized values and the numerical value of zero or from the predicted gray levels of the pixels of the blocks;

a memory portion for storing the reproduced picture; and a motion vector coding means for performing the coding of the motion vectors.

8. A motion compensated prediction interframe coding system as set forth in claim 7 wherein the predetermined area is one frame.

9. A motion compensation prediction interframe coding system as set forth in claim 7 wherein the predetermined area is one field.

10. A motion compensated prediction interframe coding system comprising:

an analog-to-digital conversion means for performing an analog-to-digital conversion of a television signal;

a block dividing means for dividing a predetermined area of the television signal digitalized by said analog-to-digital conversion means into blocks each having a predetermined size;

a motion vector calculating means for calculating a motion vector, which represents a motion of a television picture represented by the television signal, of each block and for judging with respect to each block whether or not a motion compensation prediction is performed by using by the motion vector;

a motion compensation predicting means for performing a motion compensation prediction of a reproduced picture signal of a previous frame with respect to each block of which the motion compensation prediction is determined by said motion vector calculating means to be effected and for calculating predicted gray levels of pixels of each block of which the motion compensation prediction is effected;

a prediction error evaluating means for computing the difference between the gray level of each pixel of a coding block of the television picture and the predicted gray level thereof as a prediction error thereof;

a coding method selection means for selecting a method of coding of a block from an intraframe coding and interframe coding methods;

a first switch means for selecting a signal, of which an orthogonal transform is effected, in accordance with the selection made by said coding method selecting means from the gray levels of pixels of blocks represented by the television signal and the prediction errors;

an orthogonal transform means for performing an orthogonal transform of the prediction error or the gray levels selected by said first switch means;

a first quantization step-size computing means for computing a first step size for the quantization from an amount of generated codes;

an average and variance calculating means for calculating an averaged value and a variance of the gray levels of the pixels of each block of input television signal;

a threshold value modifying means for modifying predetermined threshold values according to the first step size to classify blocks, which are represented by luminance signals and are to be coded by effecting the intraframe coding method, into a predetermined number of classes;

a second quantization step-size computing means for classifying the blocks, which are represented by luminance signals and are to be coded by effecting the intraframe coding method, into the predetermined number of classes according to the averaged value and variance and computing a second step size for the quantization of each block from the first step size in case of the blocks to be coded by using an intraframe coding method and for treating the first step sizes as the second step sizes in case of the blocks to be coded by using an interframe coding method;

a quantized transform coefficient calculating means for quantizing coefficients of an orthogonal transform by using the second step size to obtain quantized coefficients of an orthogonal transform;

an orthogonal transform coefficient coding means for performing information on the selection of the coding methods, the coding of the prediction error, the first step size and information on the classes and the quantized coefficients of the orthogonal transform;

an inverse quantization means for effecting an inverse orthogonal transform of the quantized coefficients of the orthogonal transform to obtain inversely-quantized values;

a second switch means for selecting a numerical value of zero or the predicted gray level obtained by the motion compensation prediction as a gray level of a pixels of a reproduced picture according to the selection made by said coding method selection means;

a reproduced picture calculating means for calculating a reproduced picture from the inversely-quantized values and the numerical value of zero or from the predicted gray levels of the pixels of the blocks;

a memory portion for storing the reproduced picture; and a motion vector coding means for performing the coding of the motion vectors.

11. A motion compensated prediction interframe coding system as set forth in claim 10 wherein the predetermined area is one frame.

12. A motion compensated prediction interframe coding system as set forth in claim 10 wherein the predetermined area is one field.

13. A motion compensated prediction interframe coding system as set forth in claim 1, 2, 3, 4, 5, 6, 7, 8, 9, 10, 11 or 12 wherein the variance is calculated from the following equation:

$$\sigma^2 = (1/(M \times N)) \sum_{i=1}^{M} \sum_{j=1}^{N} (p(i,j) - P)^2$$

where M represents the number of pixels on a row of a block; N the number of rows of the block; p(i,j) a gray level of a pixel at an address (i,j) in the block; and P the averaged value of the gray levels of the pixels of the block obtained by $$P = (1/(M \times N)) \sum_{i=1}^{M} \sum_{j=1}^{N} p(i,j).$$

14. A motion compensated prediction interframe coding system as set forth in claim 1, 2, 3, 4, 5, 6, 7, 8, 9, 10, 11 or 12 wherein the variance is calculated from the following equation:

$$D = (1/(M \times N)) \sum_{i=1}^{M} \sum_{j=1}^{N} |p(i,j) - P|$$

where p(i,j) denotes a gray level of a pixel at an address (i,j) in the block; and P the averaged value of the gray levels of the pixels of the block given by $$P = (1/(M \times N)) \sum_{i=1}^{M} \sum_{j=1}^{N} p(i,j).$$

15. A motion compensated prediction interframe coding system as set forth in claim 1, 2, 3, 4, 5, 6, 7, 8, 9, 10, 11 or 12 wherein the predetermined number of the classes is four.

16. A motion compensated prediction interframe coding system as set forth in claim 1, 2, 3, 4, 5, 6, 7, 8, 9, 10, 11 or 12 wherein the second step size is determined to be small for a block having a small variance.

17. A motion compensated prediction interframe coding system as set forth in claim 10, 11 or 12 wherein the threshold values are modified by using the following equation:

$$thi = -\{thi/(max - thq)\}(Qb - thq) + thi$$

where a subscript i indicates an integer from 1 to 4; and "max" represents a maximum value of the first step size.

* * * * *